United States Patent
Hanebutte et al.

(10) Patent No.: US 12,430,108 B2
(45) Date of Patent: *Sep. 30, 2025

(54) MULTISTAGE COMPILER ARCHITECTURE

(71) Applicant: Marvell Asia Pte Ltd, Singapore (SG)

(72) Inventors: Ulf Hanebutte, Gig Harbor, WA (US);
Senad Durakovic, Palo Alto, CA (US);
Chien-Chun Chou, Morgan Hill, CA (US);
Fu-Hwa Wang, Saratoga, CA (US);
Mohana Tandyala, Fremont, CA (US)

(73) Assignee: Marvell Asia Pte Ltd, Singapore (SG)

( * ) Notice: Subject to any disclaimer, the term of this patent is extended or adjusted under 35 U.S.C. 154(b) by 333 days.

This patent is subject to a terminal disclaimer.

(21) Appl. No.: 17/684,871

(22) Filed: Mar. 2, 2022

(65) Prior Publication Data

US 2023/0004365 A1 Jan. 5, 2023

Related U.S. Application Data

(63) Continuation-in-part of application No. 17/390,143, filed on Jul. 30, 2021, now Pat. No. 11,467,811.

(60) Provisional application No. 63/230,598, filed on Aug. 6, 2021, provisional application No. 63/214,651, filed on Jun. 24, 2021.

(51) Int. Cl.
*G06F 9/44* (2018.01)
*G06F 8/41* (2018.01)

(52) U.S. Cl.
CPC .............. *G06F 8/44* (2013.01); *G06F 8/425* (2013.01)

(58) Field of Classification Search
None
See application file for complete search history.

(56) References Cited

U.S. PATENT DOCUMENTS

| | | | |
|---|---|---|---|
| 9,357,411 B2 * | 5/2016 | Sridhara | G06F 21/552 |
| 10,627,889 B2 | 4/2020 | Chenchev et al. | |
| 10,977,018 B1 * | 4/2021 | Hwang | G06F 8/47 |
| 11,797,876 B1 | 10/2023 | Wang et al. | |
| 2008/0098207 A1 * | 4/2008 | Reid | G06F 11/3636 |
| | | | 714/E11.207 |
| 2019/0042395 A1 | 2/2019 | Tian et al. | |
| 2019/0325056 A1 * | 10/2019 | Sloane | G06F 8/60 |
| 2020/0285788 A1 | 9/2020 | Brebner | |
| 2021/0049465 A1 * | 2/2021 | Bogdan | G06N 3/045 |
| 2022/0101194 A1 * | 3/2022 | Liu | G06F 8/433 |
| 2022/0113972 A1 * | 4/2022 | Nakamura | G06F 8/4434 |
| 2022/0197616 A1 | 6/2022 | Drepper et al. | |

* cited by examiner

Primary Examiner — Qamrun Nahar

(57) ABSTRACT

A system includes a compiler including a plurality of compiler blocks. The compiler blocks of the plurality of compiler blocks are compossible. The compiler is configured to identify one or more resources in a hardware to execute a set of low-level instructions that is generated from a high-level function in a high-level code. The compiler is further configured to determine one or more processing operations to be performed that is associated with the high-level function in the high-level code. The determining of the one or more processing operations occurs based on architecture of the hardware. The compiler is configured to compile the high-level function in the high-level code of the application into the set of low-level instructions to be executed on the hardware.

40 Claims, 12 Drawing Sheets

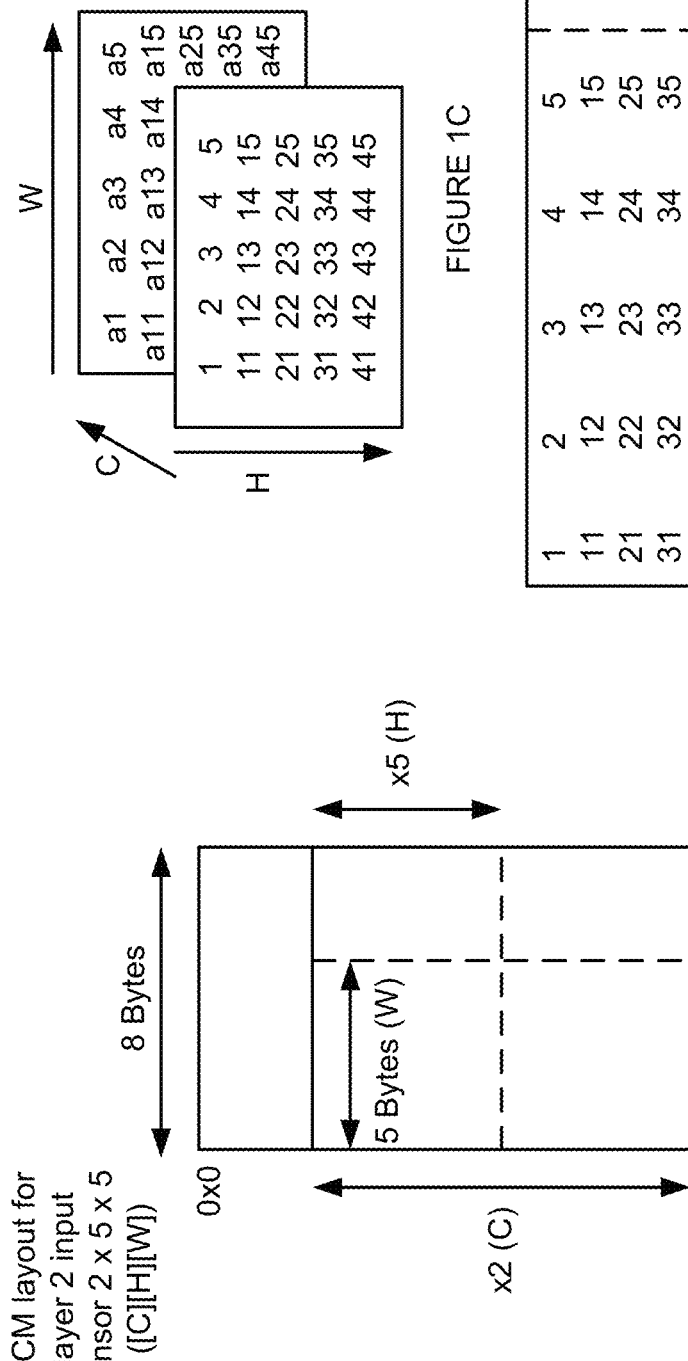

| | | | | | | | |
|---|---|---|---|---|---|---|---|
| 1 | a1 | x | x | x | x | x | x |
| 2 | a2 | x | x | x | x | x | x |
| 3 | a3 | x | x | x | x | x | x |
| 4 | a4 | x | x | x | x | x | x |
| 5 | a5 | x | x | x | x | x | x |
| 11 | a11 | x | x | x | x | x | x |
| 12 | a12 | x | x | x | x | x | x |
| 13 | a13 | x | x | x | x | x | x |
| 14 | a14 | x | x | x | x | x | x |
| 15 | a15 | x | x | x | x | x | x |
| 21 | a21 | x | x | x | x | x | x |
| 22 | a22 | x | x | x | x | x | x |
| 23 | a23 | x | x | x | x | x | x |
| 24 | a24 | x | x | x | x | x | x |
| 25 | a25 | x | x | x | x | x | x |
| 31 | a31 | x | x | x | x | x | x |
| 32 | a32 | x | x | x | x | x | x |
| 33 | a33 | x | x | x | x | x | x |
| 34 | a34 | x | x | x | x | x | x |
| 35 | a35 | x | x | x | x | x | x |
| 41 | a41 | x | x | x | x | x | x |
| 42 | a42 | x | x | x | x | x | x |
| 43 | a43 | x | x | x | x | x | x |
| 44 | a44 | x | x | x | x | x | x |
| 45 | a45 | x | x | x | x | x | x |

FIGURE 1G

MULTISTAGE COMPILER ARCHITECTURE

RELATED APPLICATION

This application is a nonprovisional application and claims the benefit and priority to a provisional application No. 63/230,598 filed on Aug. 6, 2021, which is incorporated herein by reference in its entirety.

This application is a continuation-in-part application that claims the benefit and priority to the U.S. patent application Ser. No. 17/390,143 that was filed on Jul. 30, 2021, which further claims the benefit and priority to a provisional application No. 63/214,651 that was filed on Jun. 24, 2021, which is incorporated herein by reference in its entirety.

BACKGROUND

Use and implementations of machine learning (ML) and artificial intelligence (AI) methods on electronic devices has become ubiquitous. The design of a hardware architecture of the electronic devices, whether a processor, a programmable logic, a dedicated hardware such as application specific integrated circuit (ASIC), or a dedicated ML hardware, often goes through various optimization and compilation processes.

A compilation process or a compiler generates low-level executable instructions (in binary) from one or more high-level code and identifies hardware resources to execute the low-level executable instructions. The compilation process may include quantization, reduction in mathematical precision, mapping of the application (e.g., a neural network) to a specific number of processing tiles of the hardware. In general, the compiler maps data, e.g., the network tensor weight, the network tensor bias constants, the network tensor input and output for each network layer, etc., to particular memories and generates the executable code associated therewith. For example, the compiler decides on which processing tile and which processing unit (e.g., POD and/or PE) of the tile of a multi-core system will be processing certain data. As another example, the compiler may decide that certain data is to be processed by a central processing unit as opposed to a tile within a ML hardware.

Electronic devices have become more complex and may include multiple memory systems, as an example. As one nonlimiting example, a dedicated ML hardware may include multiple memory systems. During the execution of the compiled instructions on the ML hardware, data, e.g., tensor data, may reside on multiple different memory blocks within the hierarchy. Moreover, the data may be represented by different precisions, orientation, or split across distributed blocks based on the system requirement, e.g., channel/height/width as opposed to height/width/channel and number of bytes needs due to alignment needed in hardware. Unfortunately, none of this information is automatically available for debugging, verification, and/or optimization purposes. Conventionally, for smaller networks, the memory allocation and access may be spot check using a manual and time consuming process which is not scalable to the entire network or the memory space.

Conventionally, a compiler that has been used has been static and incapable of adapting to rapidly changing environment and technologies. For example, conventionally a compilation block has been incapable of being replaced with a different compilation block, thereby requiring a completely new compiler to be developed which has been a time consuming process. Furthermore, compilation has been traditionally a black box without much feedback or suggestion to the user to debug, optimize, correct error, proper use, etc.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 1B-1G depict examples of data formats and memory layout according to one aspect of the present embodiments.

DETAILED DESCRIPTION

Figure 1A:
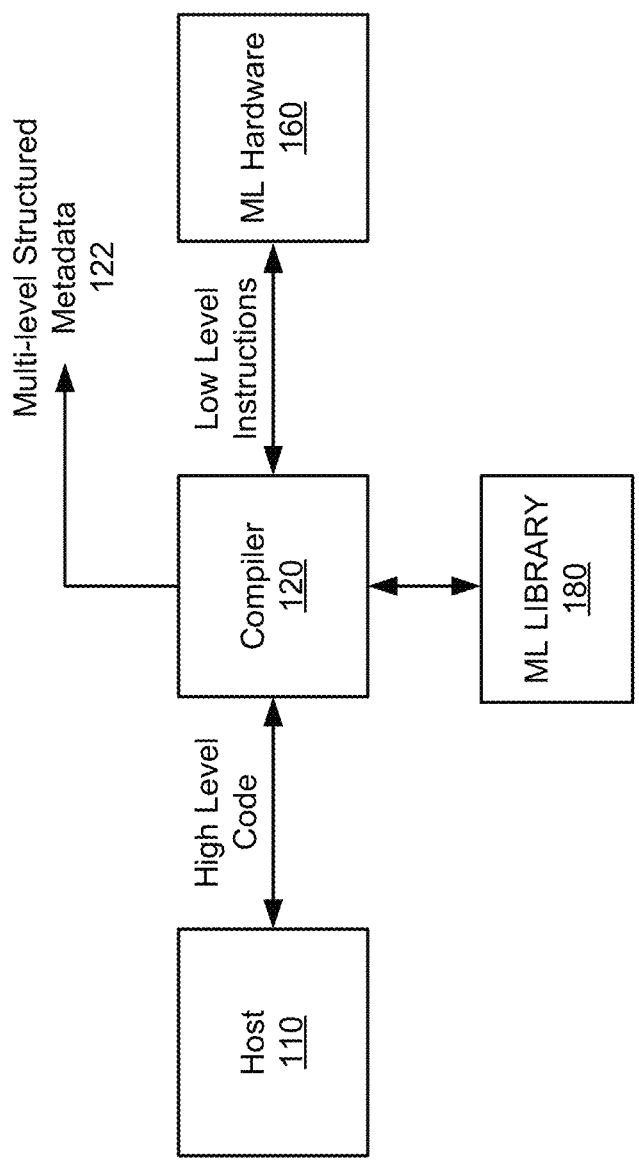
FIG. 1A depicts an example of a diagram of a system to generate a multi-level structured metadata when the high-level code is being compiled into low-level instructions of an application for running on ML hardware according to one aspect of the present embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein. It should also be understood that the terminology used herein is for the purpose of describing the certain concepts, and the terminology is not intended to be limiting. Unless defined otherwise, all technical and scientific terms used herein have the same meaning as commonly understood in the art to which the embodiments pertain.

A new approach is proposed that contemplates systems and methods to support a multi-leveled compiler-generated metadata that may be utilized by a software or a person for code verification, debugging, and/or optimization purposes. In general, a compiler is configured to go through multiple levels or stages during compilation of high-level code into low-level executable instructions on a hardware. At each level (i.e. stage), the compiler needs to make one or more decisions on compilation, e.g., how to map the data to be processed and to which memory blocks, decision on a particular processing tile to execute the executable code for a particular data, etc. It is appreciated that references to level of backend compiler (discussed later in the application) refers to stages of compilation by the backend compiler. At each level, the compiler in addition to generating the low-level executable code also generates the multi-layered structured metadata for that stage that reflects the action(s)/decision(s) being made by the compiler, e.g., mapping of data to memory blocks, precision, quantization, processing tile to perform a particular task/instruction, dimension reordering, copying across processing tiles, etc. It is appreciated that the compiler action(s)/decision(s) occur first in order for the high-level code to be compiled into low-level executable instructions. In some embodiments, the multi-layered structured metadata may include comments in a generated code that is human readable. It is appreciated that the multi-layered structured metadata may be readable or executable by the compiler or another software in some embodiments. In some embodiments, the multi-layered structured metadata may be stored in one or more files or it may be included as part of the assembly code.

It is appreciated that according to some embodiments, the stages of compilation may be compossible. In other words, different compiler blocks associated with each stage may be swapped and replaced with a different compiler block, as needed. For example, a first compiler block that is different from a second compiler block may be used at different stages of compilation. As such, different compiler blocks may be adapted and/or optimized depending on the use case, which has become even more important in rapidly emerging technology such as ML. Examples of the use cases may include but is not limited to support of customer-specific deep-learning networks, novel deep-learning networks with new operators, compilation to different ML hardware (i.e., accelerators architecture), etc.

According to some embodiments, a compiler block may be replaced with a block that includes experimental algorithms and/or implementations, thereby enabling further optimization and debugging capabilities that were previously not available. Experimental compiler block may include a different mapping strategy and/or memory allocation strategy. In yet another embodiment, the compiler block may be replaced with a debug version of the same block. It is appreciated that a debug version of the compiler block may track and store additional information regarding the compilation and/or modification to the internal representation and/or meta data that results in a debug binary. Performance of the original version of the compiler block and the debug version may be compared and necessary optimization may be performed.

It is appreciated that compossibility of the compiler block aids in development of the overall compiler and provides flexibility to adapt to rapidly changing technologies, e.g., evolving ML models, evolving ML hardware, etc.

In some ML applications, the multi-layered structured metadata may be generated by the compiler automatically and it may include information such as location of data, e.g., tensor, which is a nested data structure widely used for ML applications, in various memory blocks within the layer. It is appreciated that the multi-layered structured metadata may also provide information regarding the memory location (e.g., host memory, device memory, chip memory, etc.) for each tensor at any given stage in the network execution. Accordingly, expected memory dumps may be generated based on the original tensor that can be used for comparison to memory dumps of the actual hardware, software emulator or hardware emulator runs. As such, the low-level code/instructions can be verified and debugged based on the metadata generated by the compiler.

The multi-layered structured metadata at each layer may also include information regarding certain actions (i.e. decisions) by the compiler, e.g., precision, orientation, split across distributed blocks, quantization, processing tile to perform a certain operation, etc. In some embodiments, the multi-layered structured metadata may describe transformation associated with data being processed, e.g., transformation associated with tensors such as quantization, reducing precision, dimension reordering (e.g., conversion to/from width/height/channel (WHC) from/to channel/height/width (CHW)), splitting or copying across processing tiles, or other compile time optimizations that may result in reduced execution time of the compiled code. It is appreciated that references to tensors are provided for illustrative purposes throughout the application and should not be construed as limiting the scope of the embodiments.

In some embodiments, the multi-layered structured metadata at each layer may be used for optimization purposes, e.g., reducing data movement, reducing storage, reducing duplicate computations, reducing communication by duplicating computing if beneficial, reducing data conversions, etc. In some embodiments, the multi-layered structured metadata generated from one layer may be input into a subsequent layer and it may be relied upon by the compiler itself in order to optimize the compilation and decisions on how to process data and perform operations at the subsequent layer in an optimized fashion, e.g., by reducing data movement, reducing storage, reducing duplicate computations, reducing communications, reducing data conversions, etc.

It is appreciated that the compiler automatically generates the multi-layered structured metadata because the compiler is aware of the system requirements, e.g., channel/height/width as opposed to height/width/channel and number of bytes needs due to alignment needed in hardware. Moreover, the compiler is aware of the hardware architecture, e.g., ML hardware (number of processing tiles, etc.), and as a result automatically generates the multi-layered structured metadata for each layer and decisions that the compiler is making with respect to how to process/map processing and data to the hardware. As such, the multi-layered structured metadata once generated can be used for debugging, verification, or optimization purposes.

Since the overall number of low-level instructions to be executed on the ML hardware remains the same and no additional instructions are introduced because the multi-layered structured metadata is generated as comments that are not executed or stored in one or more files, the instruction flow and the executables of the application are not adversely affected or disturbed for performance profiling purposes. As a result, accurate performance profiling and debugging of the application can be achieved as well as optimization if desired.

Although an instruction set architecture (ISA) is used as a non-limiting example of the low-level instruction format to illustrate the proposed approach in the embodiments described below, it is appreciated that the same or similar approach is equally applicable to other types of low-level instructions. It is also appreciated that an ML hardware (e.g., inference engine) is used as a non-limiting example of the hardware where the low-level instructions are executed to illustrate the proposed approach in the embodiments described below, it is appreciated that the same or similar approach is equally applicable to other types of hardware or hardware simulator to support generating a metadata using a compiler that can ultimately be used for verification, debugging, and optimization purposes. Moreover, it is appreciated that an ML-related operation or function is used as a non-limiting example of the application of the high-level code to illustrate the proposed approach in the embodiments described below, it is appreciated that the same or similar approach is equally applicable to other types of software applications including but not limited to firmware, hardware simulation software, or register transfer level (RTL) simulation software, to support the compiler generating a metadata.

FIG. 1A depicts an example of a diagram of a system to support generating a multi-level structured metadata when the high-level code is being compiled into low-level instructions of an application for running on ML hardware. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1A, the system includes a host 110, a compiler (compiling engine) 120, optionally an ML library 180, and an ML hardware 160. It is appreciated that one or more components of the system may run on one or more computing units or devices (not shown) each with software instructions stored in a storage unit such as a non-volatile memory of the computing unit for practicing one or more processes. When the software instructions are executed, at least a subset of the software instructions is loaded into memory by one of the computing units, which becomes a special purposed one for practicing the processes. The processes may also be at least partially embodied in the computing units into which computer program code is loaded and/or executed, such that, the computing units become special purpose computing units for practicing the processes.

In the example of FIG. 1A, the compiler 120 coupled to a host 110 is configured to accept a high-level code of an application (e.g., an ML operation) from the host 110, wherein the high-level code includes a plurality of high-level functions/operators each called at one or more lines in the high-level code. The compiler 120 is then configured to compile each high-level function/operator in the high-level code into a set of low-level instructions to be executed on the ML hardware 160, wherein each set of the low-level instructions is uniquely identified and associated with the high-level function. It is appreciated that the ML hardware 160 is provided for illustrative purposes and should not be construed as limiting the scope of the embodiments. For example, any type of hardware based system configured to execute low-level instructions may be used.

Here, the high-level code is a software code written through a commonly-used high-level programming language. For a non-limiting example, the high-level functions of the application or ML operation can be a dense and/or regular operation, e.g., a matrix operation such as multiplication, matrix manipulation, tanh, sigmoid, etc. For another non-limiting example, the high-level functions of the application or ML operation can be a sparse or irregular operation, e.g., memory transpose, addition operation, operations on irregular data structures (such as trees, graphs, and priority queues), etc. In some embodiments, the high-level code of the application may include one or more library function calls to an ML library 180. For a non-limiting example, the compiler 120 may call a library function to perform a matrix-matrix-multiplication of two matrices of given sizes and the ML library 180 returns the set of low-level instructions that are needed to perform this library function, wherein the set of low-level instructions includes one or more of loading data from a memory (e.g., OCM) into registers, executing dot-product, and storing the data back into the memory.

In some embodiments, the set of low-level instructions are in the format of ISA designed for efficient data processing covering, for non-limiting examples, one or more of different addressing modes, native data types, registers, memory architectures, and interrupts. In some embodiments, the ISA is a predominantly asynchronous instruction set, wherein each instruction in the ISA format programs a state-machine, which then runs asynchronously with respect to other state machines. It is appreciated that a series of instructions in the ISA format do not necessarily imply sequential execution. In some embodiments, the ISA provides separate synchronizing instructions to ensure order between instructions where needed. In some embodiments, when being executed on the ML hardware 160, the set of low-level instructions in the ISA format program the ML hardware 160 by one or more of: (i) programming one or more input data streams to the ML hardware 160; (ii) programming one or more operations to be performed on the input data streams; and (iii) programming one or more output data streams from the ML hardware 160.

In some embodiments, the compiler 120 is configured to generate additional information to further correlate the high-level function to one or more layers of a neural network used for machine learning applications. For non-limiting examples, the neural network can be but is not limited to one of a convolution neural network (CNN), a recurrent neural network (RNN), a gradient boosting machine (GBM), and a generative adversarial neural network. For non-limiting examples, the additional information includes but is not limited to which tasks of the high-level function belong to a specific neural network layer as well as which neural network layer the high-level function belongs to.

Figure 4:
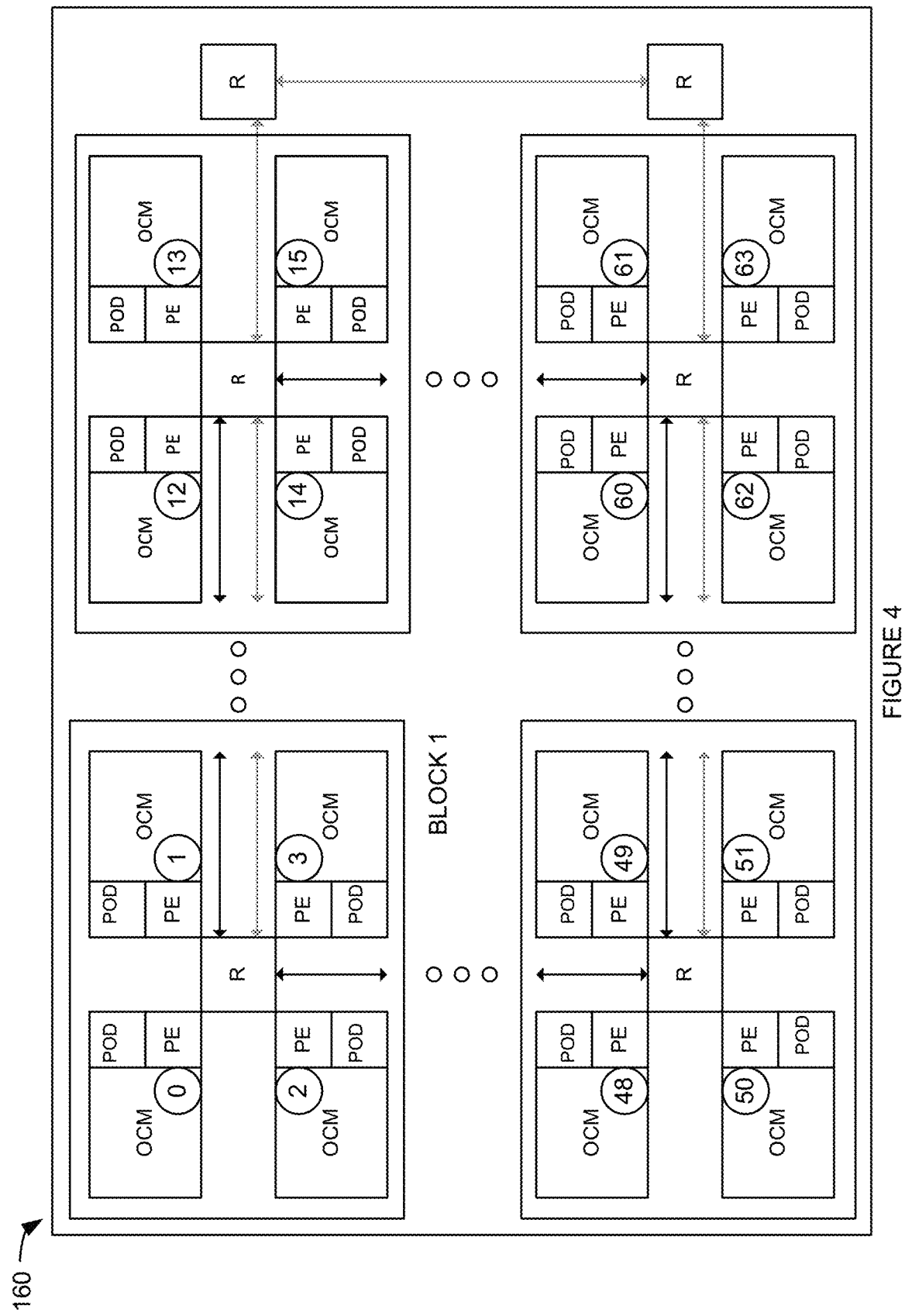
FIG. 4 depicts an example of an inference engine that includes a plurality of processing tiles arranged in a two-dimensional array of a plurality of rows and columns according to one aspect of the present embodiments.

Once the set of low-level instructions has been compiled from each high-level function, the compiler 120 is configured to stream the set of low-level instructions as well as data received from the host for the application to the ML hardware 160 for execution. In the example of FIG. 1A, the ML hardware 160 is a dedicated hardware block/component including one or more microprocessors and/or on-chip memory (OCM) units storing the data and/or the set of low-level instructions compiled from the high-level code performing one or more ML operations. For a non-limiting example, the ML hardware 160 can be but is not limited to an inference engine, which is configured to infer and identify a subject for the application via inference from trained data. At runtime, the ML hardware 160 is configured to retrieve the set of low-level instructions and/or data received from the compiler 120 and execute the set of low-level instructions to perform the high-level application/ML operation according to the set of low-level instructions. FIG. 4 depicts a non-limiting example of an inference engine 160 that includes a plurality of processing tiles, e.g., tiles 0, ..., 63, arranged in a two-dimensional array of a plurality of rows and columns, e.g., 8 row by 8 columns. Each processing tile (e.g., tile 0) includes at least one OCM, a first type of processing unit (POD), and a second type of processing unit (PE). Both types of processing units can execute and be programmed by some of the plurality of low-level instructions received from the compiler 120. In some embodiments, a plurality of processing tiles forms a processing block, e.g., tiles 0-3 forms processing block 1 and the processing tiles within each processing block are coupled to one another via a routing element, e.g., tiles 0-3 are coupled to one another via routing element R to form processing block 1.

In order to generate the low-level instructions from high-level functions/code, the compiler 120 having knowledge of the ML hardware 160 architecture and software/system requirements makes certain decisions and performs certain operations in order to generate low-level instructions that are as efficient and as optimized as possible (e.g., from hardware perspective and/or software perspective). For example, the compiler 120 may take certain actions and make certain decisions to reduce data movement, to reduce data conversions, to reduce storage usage, to reduce computation (or duplication of computation), to reduce communication (by duplicating compute if beneficial), etc. A nonlimiting and non-exhaustive list of decisions being made by the compiler 120 in addition to the above includes but is not limited to:

- identifying and associating certain sub-graphs of a layer to be processed by ML hardware 160 but other sub-graphs to other processing components (e.g., a central processing unit),
- fusing operators into composite to map to hardware ISA task (i.e. maps optimally to hardware architecture capabilities),
- splitting input/output tensors of an operation into N parts where N may be the maximum number of tiles or smaller and distributing the parts across the N tiles. The parts may be of unequal sizes and the split input/output may duplicate the associated weights and bias tensors across all N tiles,
- splitting weights/bias (similar to splitting input/output but applied to weights/bias),
- SAMM/LAMM (different mappings of two matrices onto the POD registers based on the shape of the matrices and where SAMM indicates one dimension of the input being short whereas LAMM indicates one dimension of the input being long),
- direct convolution (i.e. performing a convolution by directly applying the kernel to the input tensor in contrast to converting a convolution into a matrix-matrix-multiply that is executed after the input tensor is transformed by the flattening stage which results in an increased data movement and data duplication),
- serializing in time (i.e. mapping an operation into a sequence of steps that are executed sequentially in time),
- number of tiles to use for certain processing/tasks,
- dividing tensors and duplicating on tiles (i.e. manner by which to map data to local tiles either distribute or copy or both, where a set of tiles may be grouped together and within the group the data may be split after the original data is duplicated or copied to each group),
- number of halo cells (i.e. also referred to as ghost cells or rows that are added to distribute data on a tile which contains copies of rows or cells belonging to its neighboring tiles) that allows calculations on a tile be done locally without requiring data to be obtained from neighboring tiles even though it may need the halo cells/rows to be filled via communication prior to executing the calculations,
- data movement,
- rebalancing processing on different tiles,
- memory hierarchy mapping,
- determining tensor life-cycle (i.e. the amount of time that the tensor data is required to be in memory (mapped to local OCM) to ensure that the last task/instruction that needs to have access to the tensor data has access to the tensor data) in order to perform memory management and to free up unused memory,
- quantization scaling values (i.e. the output of a certain layer in a quantized network may be rescaled to stay within a particular data range),
- quantization data types (e.g., signed versus unsigned such as int8 and uint8),
- rescaling,
- determining which primitive to use for a given operator (e.g., direct convolution as opposed to flattening plus compute pipeline, complete fully connected (FC) layer (i.e. a matrix-matrix-multiply that might be performed as one distributed matrix-matrix-multiply (performed as single computation block followed by a single communication block) as opposed to being broken up into a pipeline sequence distributed matrix-matrix-multiplies which allows overlapping of communication and computation),
- input to pipeline decisions (i.e. decision whether to apply a pipeline strategy, e.g., based on matrix sizes the optimal strategy may not be pipelined),
- overlapping different hardware components, e.g., processing elements, direct memory access (DMA), etc., on ML hardware 160 to increase parallelism,
- optimizing use of synchronization primitives
- exposing and utilizing the ML hardware 160 capabilities for diverse set of workloads, e.g., ML workloads,
- memory layout and conversion, as described in more detail in FIG. 1B, (e.g., in channel/height/width or height/width/channel format, etc.).

In some embodiments, the compiler 120 in addition to generating low-level instructions is also configured to generate multi-level structured metadata 122 that can be used to debug the code, to verify the code, and/or to optimize the code and compilation. The metadata 122 encapsulates the decisions (as described above) that have been made by the compiler 120 in order to generate the low-level instructions from the high-level code.

Referring now to FIG. 1B, memory layout for channel, height, and width (CHW) according to some embodiments is shown. In this nonlimiting example, for a quantized int8 network, each element of the weight matrix is an int8 value that is represented by 1 byte, however, in an fp16 network, 2 bytes per weight elements may be needed, as 2 bytes are needed to represent an fp16 value. In this nonlimiting example, the input of the OCM layout for layer 2 tensor is in CHW format. According to this nonlimiting example, there are 2 channels and the height and width are 5 bytes each. Accordingly, there are 2 blocks of 5×5 data. In this example, the system may require 8 bytes internally for alignment needed by the hardware. Accordingly, the memory layout needed is 5×5 bytes for one channel and another 5×5 bytes for the second channel, as illustrated in FIG. 1C. In the nonlimiting example of FIG. 1C, unique names are given for each tensor element (i.e. 1, 2, 11, a1, a11) that is different from the hex values such as a45 to be 2626 in decimal, a number much larger than the range of int8 (i.e. −128 to 127), the data (2 dimensional matrices that is looked at as a single 3 dimensional tensor where the first is representing channel=1 and the second is representing channel=2) may be a matrix $$\begin{bmatrix} 1 & 2 & 3 & 4 & 5 \\ 11 & 12 & 13 & 14 & 15 \\ 21 & 22 & 23 & 24 & 25 \\ 31 & 32 & 33 & 34 & 35 \\ 41 & 42 & 43 & 44 & 45 \end{bmatrix}$$

while the data (channel=2 data of the weight tensor) may be a matrix $$\begin{bmatrix} a1 & a2 & a3 & a4 & a5 \\ a11 & a12 & a13 & a14 & a15 \\ a21 & a22 & a23 & a24 & a25 \\ a31 & a32 & a33 & a34 & a35 \\ a41 & a42 & a43 & a44 & a45 \end{bmatrix}.$$

The memory layout when stored is illustrated in FIG. 1D. As illustrated in FIG. 1D, in this nonlimiting example, the system requires 8 bytes internally and since the data is 5 bytes the remainder 3 bytes are illustrated as "x" and used by the system for internal alignment.

Figure 1F:
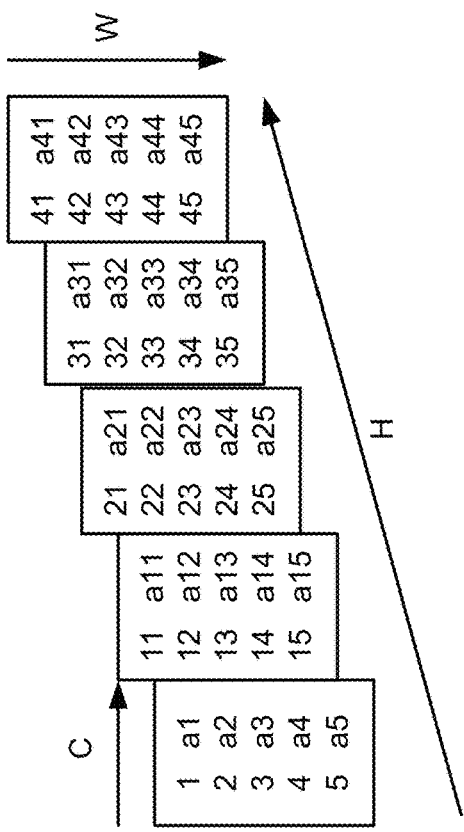
Figure 1E:
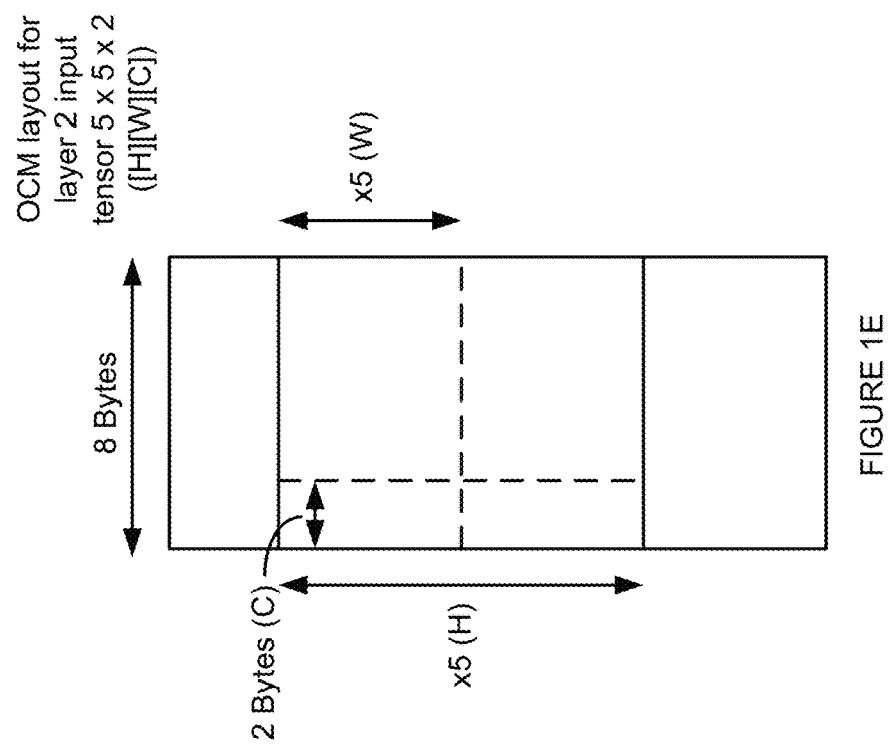

It is appreciated that, in some embodiments, the compiler 120 has knowledge of the architecture of the ML hardware 160 and its requirements, e.g., determining that conversion to HWC format is needed. Referring now to FIG. 1E, the memory layout reflecting the conversion from CHW to HWC format is shown. In this example, since the height is 5 then it is determined that there are 5 blocks of 5×2 since the width is 5 bytes and the channel is 2. FIG. 1F illustrates the blocks of data for the example shown in FIGS. 1B-1D. FIG. 1G illustrates the data once it is stored in the OCM in HWC format according to some embodiments. Here similar to FIG. 1D, since the system requires 8 internal bytes for alignment, the first two bytes are the data and the remainder 6 bytes for each row is illustrated as "x" and used for internal alignment.

It is appreciated that the conversion and the information regarding the memory layout for example is encapsulated within the multi-level structured metadata 122 being generated by the compiler 120. It is similarly appreciated that other decisions or operations performed by the compiler 120 is captured within the multi-level structured metadata 122 that can be used to optimize the operation of the compiler, debug the code, and/or verify the code.

Figure 2A:
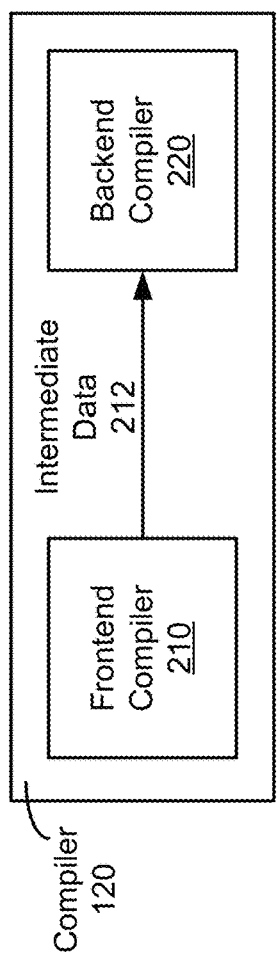
FIGS. 2A-2B depict an example of the set of low-level instructions compiled from a high-level code for an operation using a compiler according to one aspect of the present embodiments.

Referring now to FIG. 2A, a compiler 120 according to some embodiments is shown. In this nonlimiting example, the compiler 120 may include a frontend compiler 210 and a backend compiler 220. It is appreciated that the frontend compiler 210 designation and the backend compiler 220 designation is for illustration purposes only and should not be construed as limiting the scope of the embodiments. For example, a single compiler may be used. The frontend compiler 210 may perform the analysis phase of the compilation by reading the source code, dividing the code into core parts and checking for lexical, grammar, and syntax. In some embodiments, the frontend compiler 210 may include lexical analysis, syntax analysis, a semantic analysis, etc., and generates an intermediate data 212 (also known as intermediate representation). The intermediate data 212 is input into the backend compiler 220 in order to perform specific optimization and to generate the low-level instructions. It is appreciated that for ML compilers, the frontend compiler 210 may include transformation from representation in one ML-framework (such as Keras) into another representation (such as ONNX standard).

Figure 2B:
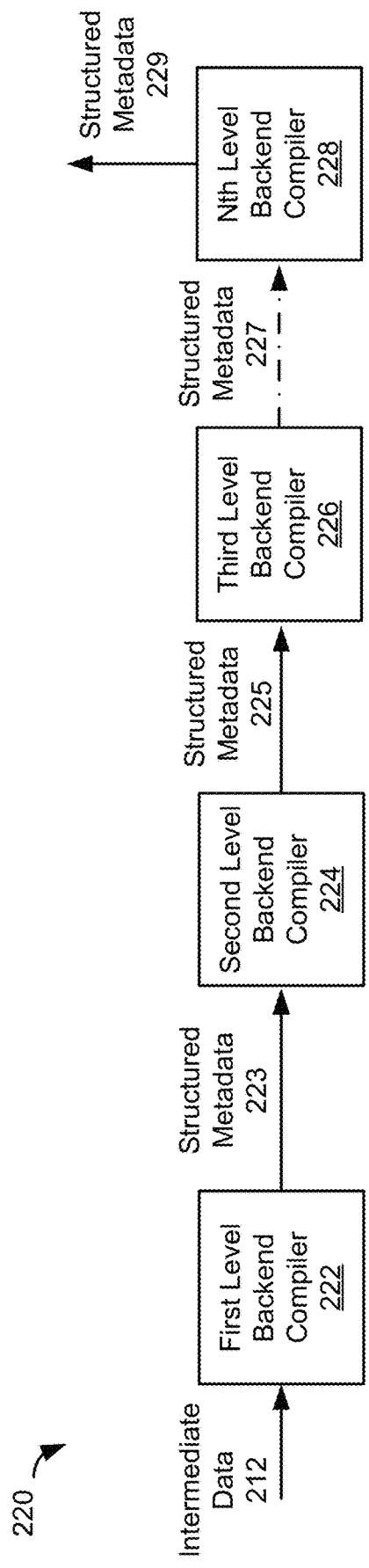

It is appreciated that the backend compiler 220 may include multiple levels according to some embodiments. For example, the backend compiler 220 may include a first level backend compiler 222, a second level backend compiler 224, a third level backend compiler 226, and Nth level backend compiler 228, as illustrated in FIG. 2B. It is appreciated that any number of levels for the backend compiler may be used and that the number of levels shown is for illustrative purposes and should not be construed as limiting the scope of the embodiments. It is appreciated that the output from each level backend compiler is input to its subsequent level backend compiler. It is also appreciated that one or more of the level backend compilers may receive additional data from a source other than other level backend compilers.

It is appreciated that according to some embodiments, the first level backend compiler 222 and/or the second level backend compiler 224 and/or the third level backend compiler 226 and/or the Nth level backend compiler 228 may be compossible. In other words, the compiler block at each level may be swapped and replaced with a different compiler block, as needed. For example, a first level backend compiler 222 block may be swapped out with a block that includes experimental algorithm (i.e., provides a different mapping strategy and/or memory allocation, etc.), debug version that tracks and stores additional information regarding the compilation and/or modification to the internal representation and/or meta data, etc. It is appreciated that the second level backend compiler 224 may or may not be the same as the first level compiler 222 and that the second level backend compiler 224 may similarly be compossible. Other compiler levels may also be compossible. As such, different compiler blocks may be adapted and/or optimized depending on the use case, which has become even more important in rapidly emerging technology such as ML. Examples of the use cases may include but is not limited to support of customer-specific deep-learning networks, novel deep-learning networks with new operators, compilation to different ML hardware (i.e., accelerators architecture), etc.

Accordingly, the compiler becomes more flexible, adaptable, debugable, and optimizable that were previously not available. It is appreciated that compossibility of the compiler block aids in development of the overall compiler and provides flexibility to adapt to rapidly changing technologies, e.g., evolving ML models, evolving ML hardware, etc.

It is appreciated that at each level backend compiler one or more structure metadata is generated in addition to the specific tasks/operations being performed by the backend compiler. For example, the first level backend compiler 222 receives the intermediate data 212 and performs transformation/optimization, e.g., target specific fusing/composition, specific data/weigh/output layout format adjustment (an example of the data/weight/output layout format adjustment is illustrated in FIGS. 1B-1G), target specific drop no operations, auto-layer identification in a subgraph (discussed in more detail with respect to the second level backend compiler 224 and in FIG. 2C). It is appreciated that the first level backend compiler 222 also generates a structured metadata 223 that provides information regarding the operations/decisions performed/made by the first level backend compiler 222. It is appreciated that the output of the first level backend compiler 222 is input to the second level backend compiler 224.

Figure 2C:
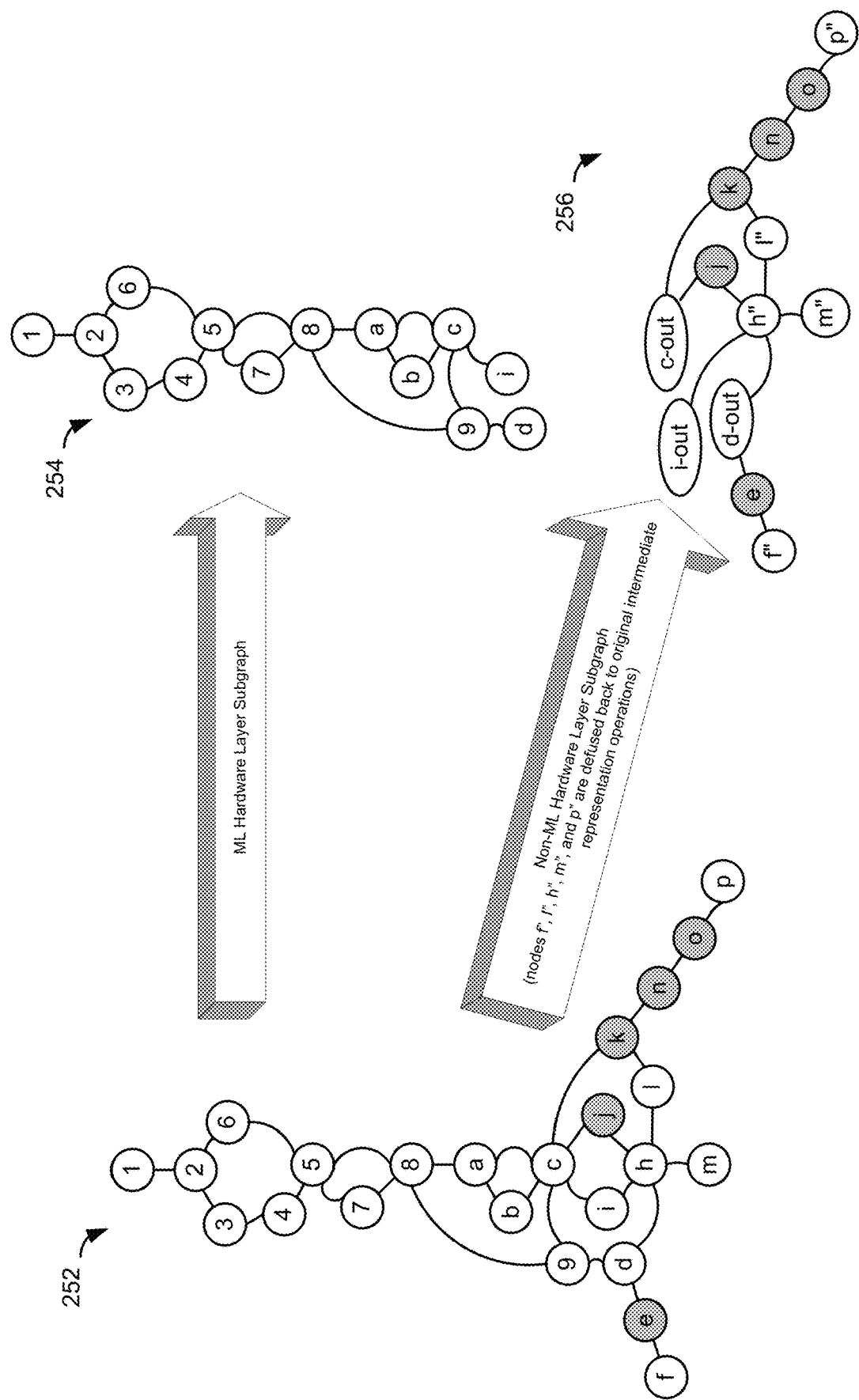
FIGS. 2C-2G depict examples of decisions/operations being performed by the compiler to convert a high-level code to a set of low-level instructions according to one aspect of the present embodiments.

In some embodiments, the second level backend compiler 224 in some nonlimiting examples performs a specific multi-layer based optimization (as an example and described in greater detail in FIG. 2C). It is appreciated that in some embodiments the second level backend compiler 224 may receive data from a source other than other backend compilers. For example, the second level backend compiler 224 may also receive the target configuration for code generation in addition to receiving the output from the first level backend compiler 222. It is appreciated that the target configuration received during inference part of the ML operation can be used to determine the number of tiles to use, OCM base address and size, determining whether to pin all memory usages in OCM or not, determining whether to use special starting memory addresses, user received input on the strategy, determining whether to use int8 of fp16 or pre-quantized flow, etc. An example of the target configuration is provided below for illustration purposes and should not be construed as limiting the scope of the embodiments. It is appreciated that the target configuration describes both the hardware architecture specifics, e.g., arch type (M1K in this example), OCM memory size (0x100000), etc., as well as specific compilation instructions, e.g., number of tiles to use such as 26 and the type of quantized network such as int8.

max_layer=100000
    quantize=int8
    arch=m1k
    inp_quantized_to=uint8
    out_dequantized_from=uint8
    dram_addr_relocatable=1
    ocm_base=0x0
    ocm_size=0x100000
    num_tiles=26
    b=1
    future-be
    wb_pin_ocm=0
    dump_wb
    new_metadata
    ext_strategy_file=<name>

In some nonlimiting examples, the computation and data are moved by the compiler 120 from inference time to compiler time once in compilation in order to reduce computations and data movements at inference runtime. It is appreciated that the second level backend compiler 224 may use a model, e.g., roofline model, given the target hardware configuration (i.e. ML hardware 160) and data layouts, at compilation time to estimate specific runtime performance. It is appreciated that the second level backend compiler 224 similar to the first level backend compiler 222 also generates a structured metadata 225. The structured metadata 225 provides information regarding the operations/decisions performed/made by the second level backend compiler 224. It is appreciated that the output of the second level backend compiler 224 is input to the third level backend compiler 226.

In some embodiments, the third level backend compiler 226 may transform the layer subgraph from the structured metadata 225 to primitive subgraph where each of the primitives may describe a certain algorithmic procedures. In some embodiments, the primitives may perform only computational tasks, only communication tasks between tiles or between tiles and double data rate (DDR), only synchronization tasks, or any combination thereof. For example, the matrix-matrix-multiply primitives LAMM and SAMM are two different computational primitives that are optimized for different matrix shapes. While "all to all" is a communication primitive, as are halo, rebalance and forward gather which are primitives that perform data movements on distributed tensor data. An example of a combined communication and computation primitive is the flattening overlap. Examples of other algorithmic procedures may include MAXPOOL, direct convolution, padding, scratch, etc. The third level backend compiler 226 determines mapping, resource allocation, and parallelism that may be applied on a layer by layer case. For example, the third level backend compiler 226 may determine whether to split input/output on tiles, split weight/bias on tiles, combination of split input/output and weight/bias and serialization on tiles, overlap primitives on tiles, use LAMM as opposed to SAMM1/SAMM2 (described in FIG. 2D) based on the manner in which the register files are used, apply direct convolution or flatten math multiplication (flattening followed by matrix-matrix multiply) or flattening matrix-matrix-multiply overlap based on layer configurations and layer format (described in FIG. 2E). In some non-limiting examples, the third level backend compiler 226 may also determine the number of tiles to use for a layer and the way to split data tensors and their computations among the tiles for that layer. The third level backend compiler 226 may also determine whether to glue or rebalance and halo tensors or partial tensors and if so the manner of which to do so between different tiles of previous layer and tiles of the next layer. In some nonlimiting examples, the third level backend compiler 226 may determine the manner by which to sync the rebalance tasks among the tiles, e.g., by applying local sync within a tile, global sync among tiles, barrier for all tiles, sync up between specific producer to specific consumer, etc. As synchronization steps are generally costly operations, different levels of synchronizations are supported by hardware that are often inserted judiciously by the compiler. For example, the PE and POD within a tile can be synchronized using a "local sync", which is very light weight as opposed to a global sync among a group of tiles or all tiles that is much more costly. Additionally, synchronization primitives are provided that are optimized as they are limited to specific consumer/producer tiles of a given communication pattern. It is appreciated that in some embodiments, the third level backend compiler 226 may determine the manner of which to reserve DDR and/or OCM memory regions for full or partial tensors to avoid read write data hazards (i.e. data corruption due to unintentional address reuse for optimization that has reused addresses), manner by which perform serialization, and manner by which to reduce data movement, etc. It is also appreciated that in some embodiments, the third level backend compiler 226 may determine the manner of which to reserve DDR and/or OCM memory regions for full or partial tensors, to perform serialization and to reduce data movement. In some nonlimiting examples, the third level backend compiler 226 may pipeline ISA tasks running on the same tile but different processing elements (i.e. PE versus POD) or on different tiles as determined from space-time analysis based on data allocations. Moreover, the third level backend compiler 226 may generate primitive graphs for representing initial job, per-inference runtime job, and per-inference finishing job based on performance needs. Additionally, the third level backend compiler 226 may use a primitive roofline model (e.g., given target hardware configuration (i.e., ML hardware 160)) at compilation time to estimate the ML hardware 160 specific runtime performance and once the final runtime performance statistics are collected the primitives may be calibrated and optimized.

It is appreciated that in some embodiments the third level backend compiler 226 may receive data from a source other than other backend compilers. For example, the third level backend compiler 226 may also receive a strategy indicated by a user (i.e. user strategy) in addition to receiving the output from the second level backend compiler 224, as illustrated below. It is appreciated that the strategy may be an external strategy generated by an analysis/profiling tool which is run external to the compiler flow. It is appreciated that in the following strategy, information for each layer of the fused graph is give. Details such as the type of operation, e.g., convolution or maxpool, the corresponding first and last ONNX operator of the original ONNX graph, the selected strategy and the externally provided strategy hints are given. For the first layer, in this example, the strategy of splitting the input and output among the tiles is applied while the weights and bias tensors are being duplicated. For this example, the hints are matching the applied strategy, but it does not need to be.

It is appreciated that the third level backend compiler 226 similar to the first and second level backend compilers 222 and 224 also generates a structured metadata 227. The structured metadata 227 provides information regarding the operations/decisions performed/made by the third level backend compiler 226. It is appreciated that the output of the third level backend compiler 226 is input to the subsequent level backend compiler(s). It is appreciated that the structured metadata 227 generated by the third level backend compiler 226 may be fed back into the third level backend compiler 226 in order to reduce the number of primitives (an example is described in FIG. 2F).

A nonlimiting example of the structured metadata 227 is shown below for illustration purposes. Below the structured metadata for DDR or OCM regions and inputs, flattening addresses, weights and bias outputs, etc., is shown. The following is a nonlimiting example of a structured metadata for convolution layer. The first part of the structured metadata provides information regarding the input, weight, bias, and outputs tensors regarding shape, format, name in original network graph and local memory allocation. Moreover, pertinent information regarding the convolution operation is given such as stride in this example. The second section of the structure metadata here provides the sequential call list of the calls to the ML-library and the specific arguments.

```
{ "file_type": "ExtStrategy",
 "layers": [
   { "id": 1, "op": "CONV", "to_layer_ids": [ 2 ], "first_onnx_op":
"resnetv17_conv0_fwd_transpose", "last_onnx_op": "resnetv17_relu0_fwd___1",
     "strategy_applied": [ "split_io", "dupl_wb" ],
     "external_strategy_hints": [ "split_io", "dupl_wb" ] }
  ,{ "id": 2, "op": "MAXPOOL", "to_layer_ids": [ 3, 4 ], "first_onnx_op":
"resnetv17_pool0_fwd___1", "last_onnx_op": "resnetv17_pool0_fwd___1",
     "strategy_applied": [ "split_io" ],
     "external_strategy_hints": [ "split_io" ] }
  ,{ "id": 3, "op": "CONV", "to_layer_ids": [ 7 ], "first_onnx_op":
"resnetv17_stage1_conv3_fwd", "last_onnx_op":
"resnetv17_stage1_batchnorm3_fwd___1",
     "strategy_applied": [ "split_io", "dupl_wb" ],
     "external_strategy_hints": [ "split_io", "dupl_wb" ] }
  ,{ "id": 4, "op": "CONV", "to_layer_ids": [ 5 ], "first_onnx_op":
"resnetv17_stage1_conv0_fwd", "last_onnx_op": "resnetv17_stage1_relu0_fwd___1",
     "strategy_applied": [ "split_io", "dupl_wb" ],
     "external_strategy_hints": [ "split_io", "dupl_wb" ] }
  ,{ "id": 5, "op": "CONV", "to_layer_ids": [ 6 ], "first_onnx_op":
"resnetv17_stage1_conv1_fwd", "last_onnx_op": "resnetv17_stage1_relu1_fwd___1",
     "strategy_applied": [ "split_io", "dupl_wb", "DIRECTCONV" ],
     "external_strategy_hints": [ "split_io", "dupl_wb" ] }
  ,{ "id": 6, "op": "CONV", "to_layer_ids": [ 7 ], "first_onnx_op":
"resnetv17_stage1_conv2_fwd", "last_onnx_op":
"resnetv17_stage1_batchnorm2_fwd___1",
     "strategy_applied": [ "split_io", "dupl_wb" ],
     "external_strategy_hints": [ "split_io", "dupl_wb" ] }
  ,{ "id": 7, "op": "SUM", "to_layer_ids": [ 8, 11 ], "first_onnx_op":
"resnetv17_stage1___plus0___1", "last_onnx_op": "resnetv17_stage1_activation0___1",
     "strategy_applied": [ "split_io" ],
     "external_strategy_hints": [ "split_io" ] }
  ,{ "id": 8, "op": "CONV", "to_layer_ids": [ 9 ], "first_onnx_op":
"resnetv17_stage1_conv4_fwd", "last_onnx_op": "resnetv17_stage1_relu2_fwd___1",
     "strategy_applied": [ "split_io", "dupl_wb" ],
     "external_strategy_hints": [ "split_io", "dupl_wb" ] }
  ,{ "id": 9, "op": "CONV", "to_layer_ids": [ 10 ], "first_onnx_op":
"resnetv17_stage1_conv5_fwd", "last_onnx_op": "resnetv17_stage1_relu3_fwd___1",
     "strategy_applied": [ "split_io", "dupl_wb", "DIRECTCONV" ],
     "external_strategy_hints": [ "split_io", "dupl_wb" ] }
 ... ] }
```

```
//    inputs: [
//      { N: 1, inH: 32, inW: 32, inC: 1, inCStride: 1, dataFormat: NHWC, name:
permute_input_0, ddr_addr: 0x36780 }
//    ],
//    stride: [ 1, 1 ],
//    flattening: { ocm_addr_start: 0xfd5c0, ocm_addr_end: 0xff400 }
//    weight: { outC: 64, kH: 3, kW: 3, inC: 1, name: mrvl_1_const_0, ddr_addr: 0x180,
ocm_addr_start: 0x0, ocm_addr_end: 0x7ff },
//    bias: { kind: FP32, outC: 64, name: mrvl_1_const_1, ddr_addr: 0x0, ocm_addr_start:
0x800, ocm_addr_end: 0x8ff },
//    outputs: [
//      { N: 1, outH: 30, outW: 30, outC: 64, outCStride: 64, name: mrvl_1_Conv2D,
ocm_addr_start: 0xe11c0, ocm_addr_end: 0xfd400 }
//    ],
//    mllib_call_list: [
//      { layer_id: 2, inst_id: 1, name: Input, type: F_ACTIV, instrType:
DDRTOLOCALCOPY_LINEAR_SEGMENTED_PERTILE,
//      tilemask: 0x1, ddrStartAddr: 0x36780, localStartAddr: 0xff7c0, length: 2048
//      , tileOffset: 2048, signExt: 0 },
//      { layer_id: 2, inst_id: 4, name: Flatten_Lamm_Overlap, type:
F_FLATTEN_OVERLAP, instrType: OVERLAP_FLAT1,
//      tilemask: 0x1, localStartAddr: 0xff7c0, localOutputAddr: 0xfd5c0
//      , inH: 32, inW: 32, inC: 1, kH: 3, kW: 3, kC: 1, lineStride: 1, tileOffset:
4294967295 },
//      { layer_id: 2, inst_id: 10, name: Flatten_Lamm_Overlap, type: F_LAMM,
instrType: OVERLAP_MULT1,
//      tilemask: 0x1, numRow: 64, arowBcol: 9, numCol: 60, amtxAddr: 0x0, bmtxAddr:
0xfd5c0, cmtxAddr: 0xe11c0, biasAddr: 0x800
//      , rscale: 1, rshift: 0, dscale: 1, qscale: 1, doRelu: 1, doTanhSigmoid: 0, tileOffset:
4294967295 },
//      { layer_id: 2, inst_id: 19, name: Flatten_Lamm_Overlap, type:
F_FLATTEN_OVERLAP, instrType: OVERLAP_FLAT1,
//      tilemask: 0x1, localStartAddr: 0xff7c0, localOutputAddr: 0xfd5c0
//      , inH: 32, inW: 32, inC: 1, kH: 3, kW: 3, kC: 1, lineStride: 1, tileOffset:
4294967295 },
//      { layer_id: 2, inst_id: 25, name: Flatten_Lamm_Overlap, type: F_LAMM,
instrType: OVERLAP_MULT1,
//      tilemask: 0x1, numRow: 64, arowBcol: 9, numCol: 60, amtxAddr: 0x0, bmtxAddr:
0xfd5c0, cmtxAddr: 0xe11c0, biasAddr: 0x800
//      , rscale: 1, rshift: 0, dscale: 1, qscale: 1, doRelu: 1, doTanhSigmoid: 0, tileOffset:
4294967295 },
//      { layer_id: 2, inst_id: 34, name: Flatten_Lamm_Overlap, type:
F_FLATTEN_OVERLAP, instrType: OVERLAP_FLAT1,
//      tilemask: 0x1, localStartAddr: 0xff7c0, localOutputAddr: 0xfd5c0
//      , inH: 32, inW: 32, inC: 1, kH: 3, kW: 3, kC: 1, lineStride: 1, tileOffset:
4294967295 },
```

Another example of a structured metadata 227 is shown below for illustration purposes. In the example below the strategy to map to 8 tiles is illustrated and illustrates how the input tensor is split among the tiles, rebalanced, haloed, and how the output tensors are split after computation. In this nonlimiting example, the maxpool layer is executed in parallel on 8 tiles. Here, the structured metadata provides information regarding the applied strategy and the mapping information of the data across 8 tiles when a row-wise split is applied. Moreover, the information includes the number of rows including padded rows as well as the number of halo rows on each tile.

```
//    Layer 3: MAXPOOL-INT8
//    **********
//INSTRUMENTATION_BEGIN
//json_annotation: {
//    strategy_plan: { split_io: yes, split_wb: no, split_in_time: no, overlap: no },
//    code_gen: { io: split_io, wb: unknown },
//    mapping_info: {
//      batch_size: 1,
//      per_batch_num_tiles: 8,
//      per_batch_mapping_list: [
//        { tid: 0, input: 14, padded: 15, to_nxt: -1, halo: 1, image: 15, y_steps: 7, x_steps:
56, output: 7 },
//        { tid: 1, input: 14, padded: 14, to_nxt: -1, halo: 1, image: 15, y_steps: 7, x_steps:
56, output: 7 },
//        { tid: 2, input: 14, padded: 14, to_nxt: -1, halo: 1, image: 15, y_steps: 7, x_steps:
56, output: 7 },
//        { tid: 3, input: 14, padded: 14, to_nxt: -1, halo: 1, image: 15, y_steps: 7, x_steps:
56, output: 7 },
//        { tid: 4, input: 14, padded: 14, to_nxt: -1, halo: 1, image: 15, y_steps: 7, x_steps:
56, output: 7 },
//        { tid: 5, input: 14, padded: 14, to_nxt: -1, halo: 1, image: 15, y_steps: 7, x_steps:
56, output: 7 },
```

```
//        { tid: 6, input: 14, padded: 14, to_nxt: -1, halo: 1, image: 15, y_steps: 7, x_steps:
56, output: 7 },
//        { tid: 7, input: 14, padded: 15, to_nxt: 0, halo: 0, image: 16, y_steps: 7, x_steps: 56,
output: 7 },
//      ],
//    },
//    inputs: [
//      { N: 1, inH: 112, inW: 112, inC: 64, inCStride: 64, dataFormat: NHWC, name:
resnetv17_relu0_fwd___1, ocm_addr_start: 0xe3fc0, ocm_addr_end: 0x100000 }
//    ],
//    pad: { top: 1, left: 1, bottom: 1, right: 1, ocm_addr_start: 0xc9340, ocm_addr_end:
0xe3f3f },
//    stride: [ 2, 2 ],
//    kernel: { kH: 3, kW: 3, name: data },
//    outputs: [
//      { N: 1, outH: 56, outW: 56, outC: 64, outCStride: 64, name:
resnetv17_pool0_fwd___1, ocm_addr_start: 0xf9dc0, ocm_addr_end: 0x100000 }
```

Other level backend compilers may perform other operations and make other decisions. For example, other backend level compilers may perform functions based on specified attributes for the primitives, e.g., forming a set of common ML library and application programming interface (APIs), in order to generate ISA tasks codes to fulfill the need for all primitives for the ML hardware 160. In some nonlimiting examples, based on specified ML library APIs with their arguments, the particular level backend compiler may generate the appropriate ISA task codes to utilize the ML hardware 160 in a streaming fashion, as an example. It is appreciated that for each ML library API with its arguments, a per ML library API roofline model is used, at the time that the code is being generated, to estimate the target specific runtime performance and to monitor and check performance with respect to each ISA instruction, and/or to determine boundary violations (attributes that lead to memory wrap around or data hazard ISA instructions being produced due to memory address reuse). It is appreciated that at the time that the compiler calls the ML library API, the arguments to the library call have all the pertinent information regarding tensors and the arithmetical operations to be performed. Thus, a roofline model can be computed for this specific API call which will provide an estimate target specific runtime of these arithmetical operations. Accordingly, the compiler can iteratively decide on which API to call in cases where multiple different APIs are available to perform the same arithmetical operations. In some nonlimiting examples, other operations/decisions may include a model binary analyzer subcomponent that performs an overall analysis to identify potential problems in the low-level instructions (i.e. generate model binary), e.g., ill-formed OCM memory overlapping between ISA tasks/instructions, data hazard between consumer-producer tasks, etc. It is appreciated that these other level backend compilers may also generate their respective structured metadata that provide information regarding the operations/decisions performed/made by their respective level backend compiler. It is appreciated that the generated structured metadata and other output from other backend compilers are input to the Nth level backend compiler 228 as an input.

The Nth level backend compiler 228 in some nonlimiting examples performs ahead of time (AOT) compilation while inference on the ML hardware 160 accelerators and/or other processing units (e.g., CPU) run in real time. In some examples, the Nth level backend compiler 228 generates performance statistics for the inference run associated with the ML hardware 160. The Nth level backend compiler 228 may decide on whether to run the compiled code on the ML hardware 160, on its software emulator, or on a full machine emulator with the ML hardware 160 submodules. Based on the performance statistics, certain aspects of the system may be optimized, e.g., calibrate and optimize the generated code, the primitives, etc. It is appreciated that the Nth level backend compiler 228 also generates the low-level instructions for execution by the ML hardware 160. The Nth level backend compiler 228 also generates a structured metadata 229. The structured metadata 229 provides information regarding the operations/decisions performed/made by the Nth level backend compiler 228.

It is appreciated that even though not shown, one or more outputs of a given level backend compiler may be fed as a feedback loop into itself or to a preceding level backend compiler. For example, in some nonlimiting examples the output of the third level backend compiler 226 may be fed back into itself for optimization while the output of the Nth level backend compiler 228 may be fed back into the first level backend compiler 222, the third level backend compiler 226, etc. It is also appreciated that one or more of the level backend compilers may receive additional data from a source other than other level backend compilers.

Referring now to FIG. 2C, auto-layer identification in a subgraph according to some embodiments is shown. In this nonlimiting example nodes 1-9 and a-p are executable nodes of an ML layer. The graph shows executable nodes where nodes (i.e. e, j, k, n, o) that are not supported or unsuited for execution on the ML hardware 160 are shaded for illustration purposes. As described above, the first level backend compiler 222 may make a determination to split the graph of nodes 252 to two subgraph nodes 254 and 256, as illustrated on the right hand side, where the subgraph nodes 254 will be executed by the ML hardware 160 and the subgraph nodes 256 will be executed by a processing component other than the ML hardware 160, e.g., a CPU.

The first subgraph 254 is created based on nodes that are suited for execution on the ML hardware 160 layer (e.g., not only supported but also efficient to be executed by the ML hardware 160). The second subgraph 256 is created based on nodes that contains nodes that are better suited for execution on a processor other than the ML hardware 160. In this example, the first level backend compiler 222 has determined that even though nodes d, f, h, m, l, and p are executable on the ML hardware 160 (e.g., native to the ML hardware 160), it is more efficient for them to be executed on a non-ML hardware component, e.g., CPU, along with other nodes, e.g., e, j, k, n, o. It is appreciated that the nodes e, j, k, n, and o may be nonnative to the ML hardware 160 and as such better suited to be executed by a different component. Also, since nodes f, h, l, m, and p are intertwined in such a way with nodes e, j, k, n, and o that increases the overhead (e.g., storage, data movement, processing, etc.) the first level compiler 222 may determine that it is more efficient for those node layers to be executed with nodes e, j, k, n, and o. As such, nodes f, l, h, m, and p are defused back to original intermediate data (i.e. intermediate representation) operations. The defused nodes are illustrated as f", l", h", m", and p". Moreover, it is appreciated that the output from nodes c, i, and d from subgraph 254 is input to subgraph 256.

Figure 2D:
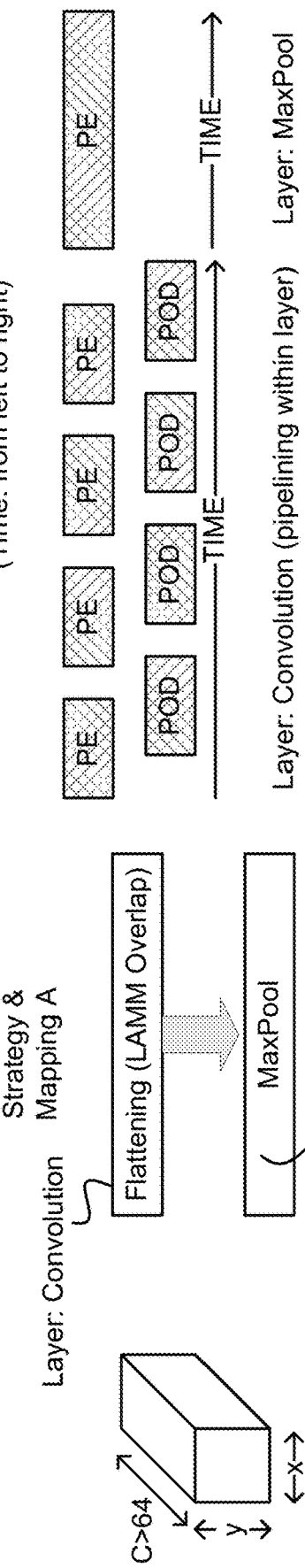

Referring now to FIG. 2D, a nonlimiting example of a decision/operation by the third level backend compiler is shown. In this example, the third level backend compiler 226 determines whether to use LAMM or SAMM and whether to split input/output on tiles, split weight/bias on tiles, combination of split input/output and weight/bias and serialization on tiles, overlap primitives on tiles, for a multiplication. It is appreciated that in some nonlimiting examples, the third level backend compiler 226 may determine that LAMM is better suited as opposed to SAMM when a batch size is 8 because it requires no transpose but SAMM does, which requires copying and as such increases the execution time. In some embodiments, the weight and the input size is also factored into the decision being made of the third level backend compiler 226. The table of FIG. 2D is provided as an example. Areg and Breg are registers within the POD of the ML hardware 160. Moreover, the decision may be based on whether to split I/O or to split weight.

Figure 2E:
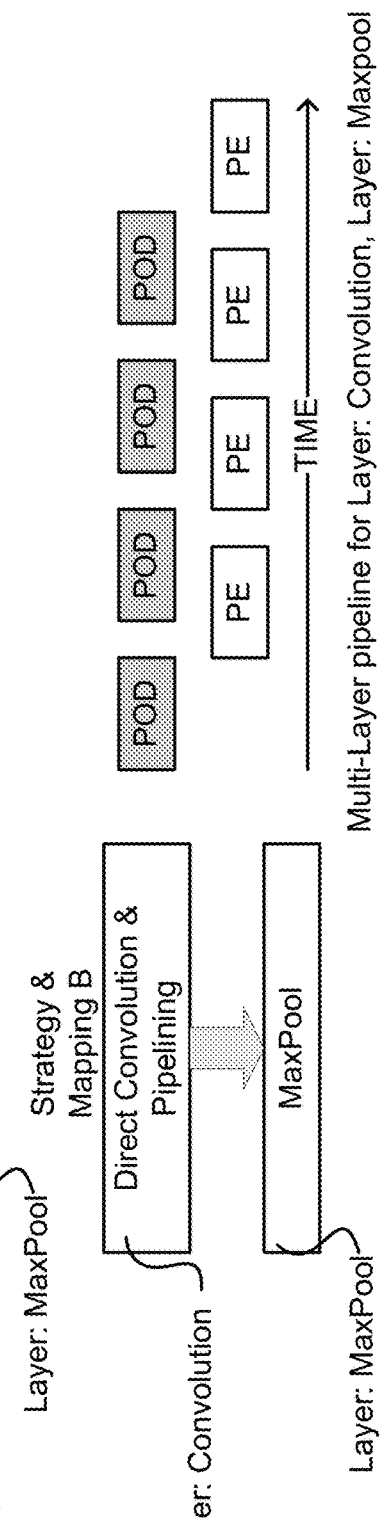

Referring now to FIG. 2E, another example of a determination by the third level backend compiler according to some embodiments is shown. FIG. 2E illustrates strategy and mapping A and strategy and mapping B based on the configuration using different primitives for performing a convolution followed by MaxPool layer. It is appreciated that strategy A uses a flattening and Lamm overlap followed by maxpool. For illustration purposes, the PE and POD on each tile work concurrently to execute the flattening and Lamm overlap which is subsequently followed by the PE performing the maxpool operation. Strategy B uses a different approach for the convolution (DirectConv) which is executed on POD while the MaxPool is executed on PE concurrently using pipelining.

Figure 2F:
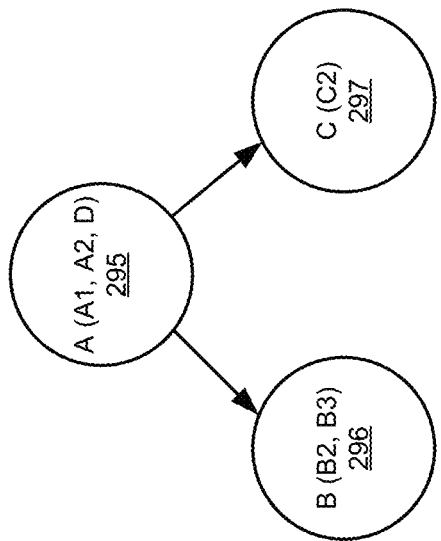
Figure 2F:
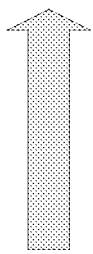
Figure 2F:
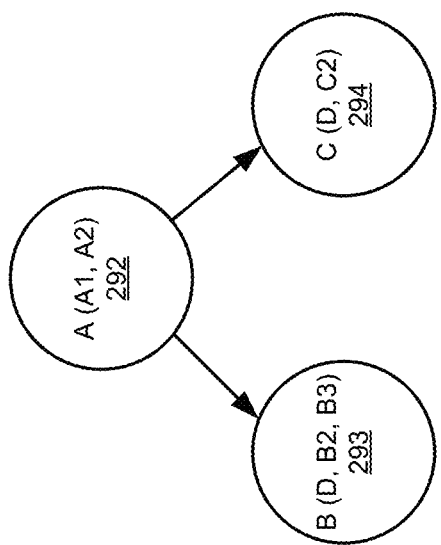

Referring now to FIG. 2F, a nonlimiting example of using a generated structured metadata by a level backend compiler to reduce the number of primitives is shown. In this example, layer A 292 may call into primitives A1 and A2 and it may fork into layer B 293 and layer C 294. In this nonlimiting example, the layer B calls into layer D and primitives B2 and B3 whereas layer C 294 calls into layer D and primitive C2. A backend compiler, e.g., the third level backend compiler 226, may optimize to reduce the number of primitives using the generated structure metadata 227. For example, the third level backend compiler 226 may determine that the layer D occurs twice and as such one can be reduced. Accordingly, the optimization may form layer A 295 calling into primitives A1 and A2 and layer D that forks into layer B 296 calling into primitives B2 and B3 and layer C 297 that calls into primitive C2. As illustrated, the call into layer D is moved into the layer A rather than being called separately by layer B and C each. As such, the structured metadata can be used by the backend compiler itself for optimization purposes.

Figure 2G:
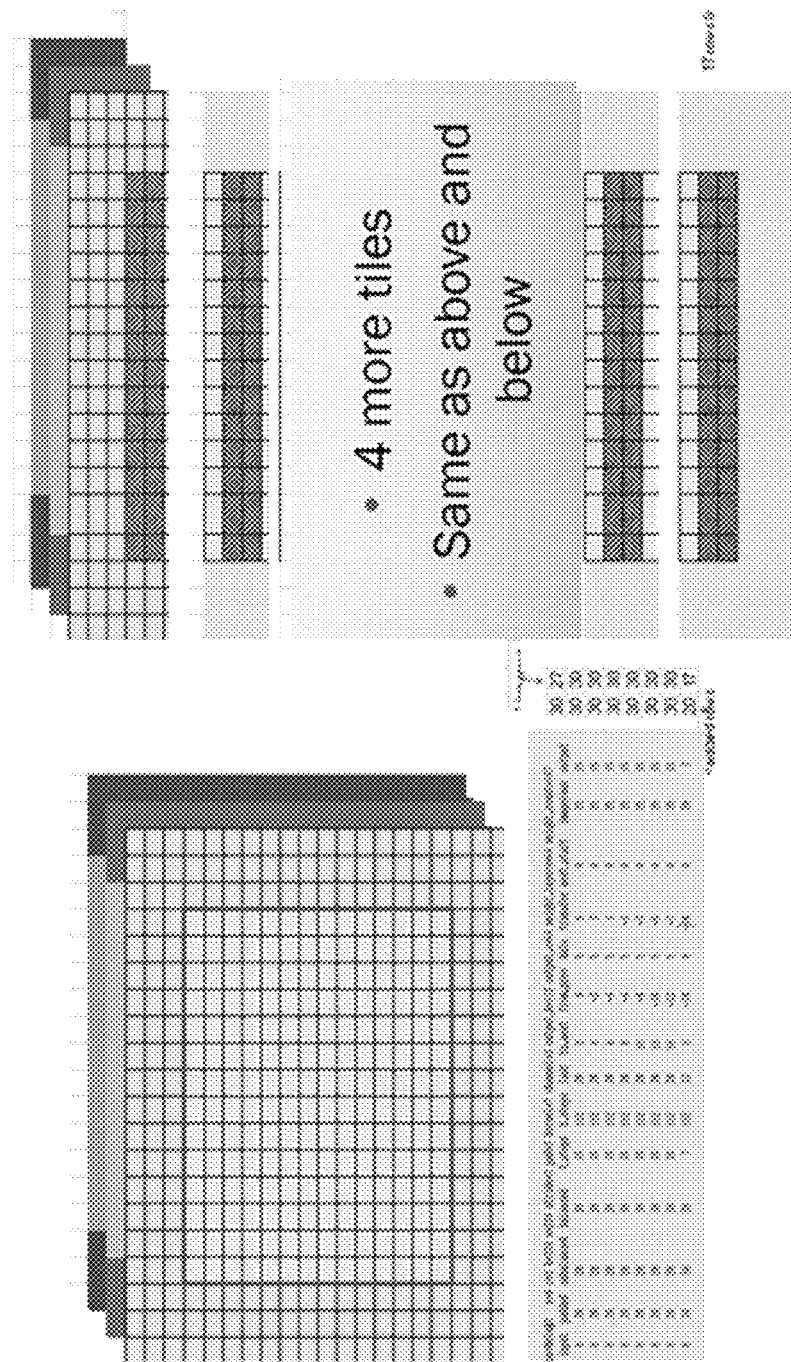

Referring now to FIG. 2G, a nonlimiting example of a backend compiler that receives a first layer in CHW format and how it maps it to the tiles and performs the required padding according to some embodiments is shown. In some examples, the first layer is received as an input in CHW format and it may be transposed to HWC format (as described above) as part of the flattening process in order to nicely map the convolution into a standard matrix-matrix multiply based on the POD architecture. In this example, the size of the padding is 3 and the input is in CHW form for a batch size of 3×224×224. It is appreciated that in some embodiments, no flattening may be needed and as such the transpose might be needed as part of the output of the previous layer or as a separate step in the input layer. In this nonlimiting example, the slicing to map to the tiles is a batch of 8 across 64 tiles, each input is split across 8 tiles and is row-wise (i.e., <35, 35, 35, 35, 35, 35, 35, 19> for tiles <7, . . . , 0>.

As described above, the backend compiler may generate one or more structure metadata. Below is another example of a code followed by the backend compiler generated metadata that illustrates the input, the weight, and the bias constants and output for a fp16 network for illustration purposes. In this nonlimiting example, a convolution layer in a network that is reduced to fp16 precision is illustrated. The structured metadata first describes the tensors involved in this operation in addition to operator specific arguments such as padding and stride information. The total number of multiply and accumulate (MAC) instructions are given. The second part of the structured metadata describes the memory layout of the tensors.

Layer 1: Conb
    Input[1]: float16, [batch, inC, H, W]=[1, 1, 32, 32]
    Weight: float16, [outC, inC, H, W]=[64, 1, 3, 3]
    Bias: float, [64]
    Padding: [top, left, bottom, right]=0, 0, 0, 0
    Stride: [h, w]=[1, 1]
    Activation: relu
    output: float16, [batch, H, W, outC]=[1, 30, 30, 64]
    # of MACS: 1036800
    # of Parameters: 640

```
//json_annotation:
//     code_gen: { io: split_io, wb: dupl_wb },
//     mapping_info: {
//       batch_size: 1,
//       per_batch_num_tiles: 8,
//     },
//     inputs: [
//       { N: 1, inH: 32, inW: 32, inC: 1, inCStride: 1, dataFormat: NCHW, name: permute_input_0, ddr_addr: 0x36780 }
//     ],
//     weight: { outC: 64, kH: 3, kW: 3, inC: 1, name: conv2d_kernel_01, ddr_addr: 0x32300, ocm_addr_start: 0x0, ocm_addr_end: 0x7ff },
//     bias: { kind: FP32, outC: 64, name: conv2d_bias_0, ddr_addr: 0x32080, ocm_addr_start: 0x800, ocm_addr_end: 0x8ff },
```

```
//      outputs: [
//          { N: 1, outH: 30, outW: 30, outC: 64, outCStride: 64, name: conv2d_Relu1,
ocm_addr_start: 0xfc380, ocm_addr_end: 0xffffbf }
//      ]
```

Below is yet another example of a code followed by the backend compiler generated metadata that illustrates quantized network for illustration purposes. In this nonlimiting example, the same convolution layer as in the previous example is shown except that in this example a network is quantized to int8. The structured metadata first describes the tensors involved in this operation in addition to operator specific arguments such as padding and stride information. The total number of MAC instructions are given. The second part of the structured metadata describes the memory layout of the tensors.

Layer 1: Conv
Input[1]: uint8, [batch, inC, H, W]=[1, 1, 32, 32]
Weight: int8, [outC, inC, H, W]=[64, 1, 3, 3]
Bias: int32, [64]
Padding: [top, left, bottom, right]=0, 0, 0, 0
Stride: [h, w]=[1, 1]
Activation: relu
output: uint8, [batch, H, W, outC]=[1, 30, 30, 64]
# of MACS: 1036800
# of Parameters: 640

```
//INSTRUMENTATION_BEGIN
//json_annotation: {
//      code_gen: { io: split_io, wb: dupl_wb },
//      mapping_info: {
//          batch_size: 1,
//          per_batch_num_tiles: 8,
//      },
//      inputs: [
//          { N: 1, inH: 32, inW: 32, inC: 1, inCStride: 1, dataFormat: NCHW, name:
permute_input_0, ddr_addr: 0x1b540 }
//      ],
//      weight: { outC: 64, kH: 3, kW: 3, inC: 1, name: conv2d_kernel_01, ddr_addr:
0x19300, ocm_addr_start: 0x0, ocm_addr_end: 0xfff },
//      bias: { kind: INT32, outC: 64, name: conv2d_bias_0, ddr_addr: 0x19080,
ocm_addr_start: 0x1000, ocm_addr_end: 0x10ff },
//      outputs: [
//          { N: 1, outH: 30, outW: 30, outC: 64, outCStride: 64, name: conv2d_Relu1,
ocm_addr_start: 0xfe180, ocm_addr_end: 0xffffbf }
//      ]
```

As yet another example, the code as generated by the backend compiler and its structured metadata is shown below for illustration purposes. In this nonlimiting example a low-level ISA instructions to be executed on ML hardware 160 is shown which is augmented with the structured metadata that are provided as comments that are excluded at runtime by the hardware.

```
//      **********
//      Layer 2: CONV-INT8
//      **********
//INSTRUMENTATION_BEGIN
//json_annotation: {
//      strategy_plan: { split_io: yes, split_wb: no, split_in_time: no, overlap: no, matmul:
DIRECTCONV },
//      code_gen: { io: split_io, wb: dupl_wb },
//      mapping_info: {
//          batch_size: 8,
//          per_batch_num_tiles: 1,
//          per_batch_mapping_list: [
//              { tid: 0, input: 16, padded: 20, to_nxt: 0, halo: 0, image: 20, y_steps: 16, x_steps:
16, output: 16 },
//          ],
//      },
//      inputs: [
//          { N: 8, inH: 16, inW: 16, inC: 128, inCStride: 128, dataFormat: NHWC, name:
input, ddr_addr: 0x32100 }
//      ],
//      pad: { top: 2, left: 2, bottom: 2, right: 2, ocm_addr_start: 0xe93c0, ocm_addr_end:
0xf5c00 },
//      stride: [ 1, 1 ],
//      weight: { outC: 64, kH: 5, kW: 5, inC: 128, name: conv2d_kernel_0_0, ddr_addr:
0x100, ocm_addr_start: 0x0, ocm_addr_end: 0x31fff },
```

```
//      bias: { kind: INT32, outC: 64, name: conv2d_bias_0, ddr_addr: 0x0, ocm_addr_start:
0x32000, ocm_addr_end: 0x320ff },
//      FC-fwd-gather: { ocm_addr_start: 0xc8fc0, ocm_addr_end: 0xe9000 },
//      outputs: [
//        { N: 8, outH: 16, outW: 16, outC: 64, outCStride: 64, name: conv2d,
ocm_addr_start: 0xc8fc0, ocm_addr_end: 0xe9000, ddr_addr: 0x72100 }
//      ],
//      mllib_call_list: [
//        { layer_id: 2, inst_id: 1, name: Input, type: F_ACTIV, instrType:
DDRTOLOCALCOPY_LINEAR_SEGMENTED_PERTILE,
//          tilemask: 0xff, ddrStartAddr: 0x32100, localStartAddr: 0xf5fc0, length: 32768
//          , tileOffset: 32768, signExt: 1 },
//        { layer_id: 2, inst_id: 4, name: --Padding, type: F_PADDING, instrType:
INT8_MEMSET,
//          tilemask: 0xff, localOutputAddr: 0xe93c0, length: 128
//          , lineStride: 128, numLines: 40, numBlks: 0, tileOffset: 4294967295 },
//        { layer_id: 2, inst_id: 8, name: --Padding, type: F_PADDING, instrType:
INT8_MEMSET,
//          tilemask: 0xff, localOutputAddr: 0xea7c0, length: 256
//          , lineStride: 2560, numLines: 18, numBlks: 0, tileOffset: 4294967295 },
//        { layer_id: 2, inst_id: 12, name: --Padding, type: F_PADDING, instrType:
LOCAL_FWD_SCATTER,
//          tilemask: 0xff, localStartAddr: 0xf5fc0, localOutputAddr: 0xea8c0, length: 128
//          , lineStride: 128, numLines: 16, blkStride: 2560, numBlks: 16, tileOffset:
4294967295 },
//        { layer_id: 2, inst_id: 16, name: --Padding, type: F_PADDING, instrType:
INT8_MEMSET,
//          tilemask: 0xff, localOutputAddr: 0xeb0c0, length: 256
//          , lineStride: 2560, numLines: 18, numBlks: 0, tileOffset: 4294967295 },
//        { layer_id: 2, inst_id: 20, name: --Padding, type: F_PADDING, instrType:
INT8_MEMSET,
//          tilemask: 0xff, localOutputAddr: 0xf47c0, length: 128
//          , lineStride: 128, numLines: 40, numBlks: 0, tileOffset: 4294967295 },
//        { layer_id: 2, inst_id: 24, name: Direct_Conv, type: F_DIRECT_CONV, instrType:
UNKNOWN,
//          tilemask: 0xff, localStartAddr: 0x0, localOutputAddr: 0xc4bc0, srcAddr: 0xe93c0,
biasAddr: 0x32000
//          , inH: 20, inW: 20, inC: 128, outC: 64, kH: 5, kW: 5, kC: 128, strideH: 1, strideW:
1, dstStride: 64, rscale: 1347632000, rshift: 42, dscale: 1, qscale: 1, doRelu: 0,
doTanhSigmoid: 0, tileOffset: 4294967295 },
//        { layer_id: 2, inst_id: 35, name: all2all, type: F_ALL_TO_ALL, instrType:
COPY_REMOTE_ABS,
//          tilemask: 0xff, srcAddr: 0xc4bc0, destAddr: 0xc8fc0, length: 64
//          , numLines: 256, numBlks: 1, stTile: 0, endTile: 0, tileOffset: 1, groupOfTile: 8 },
//        { layer_id: 2, inst_id: 41, name: ALL2ALL Global Sync, type: F_GLOB_SYNC,
instrType: COPY_REMOTE_ABS,
//          tilemask: 0xff
//          , tileOffset: 4294967295 },
//        { layer_id: 2, inst_id: 43, name: output, type: F_OUTPUT, instrType: UNKNOWN,
//          tilemask: 0x1, ddrOutputAddr: 0x72100, localOutputAddr: 0xc8fc0, length:
131072
//          , tileOffset: 4294967295 },
//      ],
//}
//INSTRUMENTATION_END
//{ layer_id: 2, inst_id: 1, name: Input, type: F_ACTIV, instrType:
DDRTOLOCALCOPY_LINEAR_SEGMENTED_PERTILE,
//      tilemask: 0xff, ddrStartAddr: 0x32100, localStartAddr: 0xf5fc0, length: 32768
//      , tileOffset: 32768, signExt: 1 }
//1
DMATaskBcst 2 0xff 0 0 0 0 0 0
DMAUnrollTaskLoopPerMaskBit 1 1 1 32768 0 0 0 0 0
DMA_DDR_to_OCM 0x32100 0xf5fc0 256 256 128 32768 1 1
//{ layer_id: 2, inst_id: 4, name: --Padding, type: F_PADDING, instrType:
INT8_MEMSET,
//      tilemask: 0xff, localOutputAddr: 0xe93c0, length: 128
//      , lineStride: 128, numLines: 40, numBlks: 0, tileOffset: 4294967295 }
//2
PETaskBcst 3 0xff 1 0 0 0 0 0
PELoadRegImm 0x1 0 16 0 1 1 1
PEMove 0x1f 0x1 16 0 0 1 1 320
PEStoreStream 0xe93c0 16 16 8 128 40 0 0 0
//{ layer_id: 2, inst_id: 8, name: --Padding, type: F_PADDING, instrType:
INT8_MEMSET,
//      tilemask: 0xff, localOutputAddr: 0xea7c0, length: 256
//      , lineStride: 2560, numLines: 18, numBlks: 0, tileOffset: 4294967295 }
//3
PETaskBcst 3 0xff 1 0 0 0 0 0
PELoadRegImm 0x1 0 16 0 1 1 1
```

```
PEMove 0x1f 0x1 16 0 0 1 1 288
PEStoreStream 0xea7c0 16 16 16 2560 18 0 0 0
//{ layer_id: 2, inst_id: 12, name: --Padding, type: F_PADDING, instrType:
LOCAL_FWD_SCATTER,
//      tilemask: 0xff, localStartAddr: 0xf5fc0, localOutputAddr: 0xea8c0, length: 128
//    , lineStride: 128, numLines: 16, blkStride: 2560, numBlks: 16, tileOffset:
4294967295 }
//4
PETaskBcst 3 0xff 1 0 0 0 0 0 0
Loop 2 1 2 2048 2 2 2560 0 0 0 16
PELoadStream1 0xf5fc0 64 64 2 128 16
PEStoreStream 0xea8c0 64 64 2 128 16 0 0 0
//{ layer_id: 2, inst_id: 16, name: --Padding, type: F_PADDING, instrType:
INT8_MEMSET,
//      tilemask: 0xff, localOutputAddr: 0xeb0c0, length: 256
//    , lineStride: 2560, numLines: 18, numBlks: 0, tileOffset: 4294967295 }
//5
PETaskBcst 3 0xff 1 0 0 0 0 0 0
PELoadRegImm 0x1 0 16 0 1 1 1
PEMove 0x1f 0x1 16 0 0 1 1 288
PEStoreStream 0xeb0c0 16 16 16 2560 18 0 0 0
//{ layer_id: 2, inst_id: 20, name: --Padding, type: F_PADDING, instrType:
INT8_MEMSET,
//      tilemask: 0xff, localOutputAddr: 0xf47c0, length: 128
//    , lineStride: 128, numLines: 40, numBlks: 0, tileOffset: 4294967295 }
//6
PETaskBcst 3 0xff 1 0 0 0 0 0 0
PELoadRegImm 0x1 0 16 0 1 1 1
PEMove 0x1f 0x1 16 0 0 1 1 320
PEStoreStream 0xf47c0 16 16 8 128 40 0 0 0
//{ layer_id: 2, inst_id: 24, name: Direct_Conv, type: F_DIRECT_CONV, instrType:
UNKNOWN,
//      tilemask: 0xff, localStartAddr: 0x0, localOutputAddr: 0xc4bc0, srcAddr: 0xe93c0,
biasAddr: 0x32000
//    , inH: 20, inW: 20, inC: 128, outC: 64, kH: 5, kW: 5, kC: 128, strideH: 1, strideW:
1, dstStride: 64, rscale: 1347632000, rshift: 42, dscale: 1, qscale: 1, doRelu: 0,
doTanhSigmoid: 0, tileOffset: 4294967295 }
//7
PodTaskBcst 10 0 0xff 1 0 0 0 0 0 0
Loop 9 2 2 32 6 2 25600 9 2 8 8
TileLoadQuantScaleConsts 1347632000 42 1 1
PDLoadBiasMM 0x32000 8 0
Loop 6 4 2 2560 6 2 1024 0 0 0 16
PDBcstBiastoCregMM 8 16 0
Loop 3 1 2 640 2 2 2560 0 0 0 5
PDLoadAregMM 0x0 128 128 3200 8 128 5
PDLoadBregMM 0xe93c0 128 128 128 16 128 5
PDDotProductMM 128 128 8 16 5
PDStoreCregMM 0xc4bc0 8 64 16 0 2 0 0
//{ layer_id: 2, inst_ id: 35, name: all2all, type: F_ALL_TO_ALL, instrType:
COPY_REMOTE_ABS,
//      tilemask: 0xff, srcAddr: 0xc4bc0, destAddr: 0xc8fc0, length: 64
//    , numLines: 256, numBlks: 1, stTile: 0, endTile: 0, tileOffset: 1, groupOfTile: 8 }
//8
PETaskBcst 5 0xff 1 0 0 0 0 0 0
TileTaskParamUpdUsingTileID 4 3 2 1 0 0 0 0 0 0 8
PELoadStream1 0xc4bc0 16 16 4 64 256
PEMove 0x1f 0x1e 16 0 0 1 1 1024
PEStoreStream 0xc8fc0 16 16 4 64 256 2 0 0
PESync
//{ layer_id: 2, inst_id: 41, name: ALL2ALL Global Sync, type: F_GLOB_SYNC,
instrType: COPY_REMOTE_ABS,
//      tilemask: 0xff
//    , tileOffset: 4294967295 }
//9
PETaskBcst 1 0xff 2 0 0 0 0 0 0
PESync
```

Figure 3:
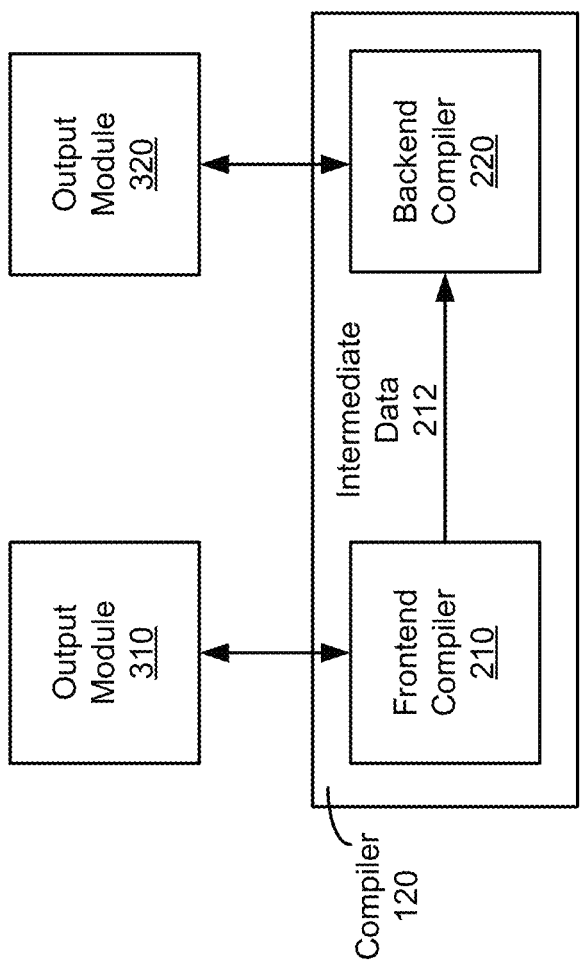
FIG. 3 depicts another example of decisions/operations being performed by the compiler to convert a high-level code to a set of low-level instructions according to one aspect of the present embodiments.

FIG. 3 depicts another example of decisions/operations being performed by the compiler to convert a high-level code to a set of low-level instructions according to one aspect of the present embodiments. FIG. 3 is similar to that of FIG. 2A except that in this embodiment, the frontend compiler 210 is coupled to the output module 310 and the backend compiler 220 is coupled to the output module 320. In some embodiments, the output module 310 may be a user guidance and error messaging module that renders one or more messages on a display or outputs into a log file for the user. Similarly, the output module 320 may be a user guidance and error messaging module that renders one or more messages on a display to the user. The display associated with the output modules 310 and 320 may or may not be the same. It is appreciated in some embodiments, the output modules 310 and 320 may be communicatively coupled to one another (not shown here). According to some embodiments, the output modules 310 and/or 320 render various informative information to the user, e.g., incorrect command line, command line options, guidance on correction of incorrect command line, etc. In some nonlimiting examples, the output modules 310 and 320 may be used to analyze the compiled deep-learning network and to identify unsupported operators and/or ill-formed networks or to identify other limitations and to provide guidance and suggestions to the user. As such, the output modules 310 and 320 may be used for debugging purposes, to provide suggestions on fixes to errors, to provide suggestions on optimization, etc.

Figure 5:
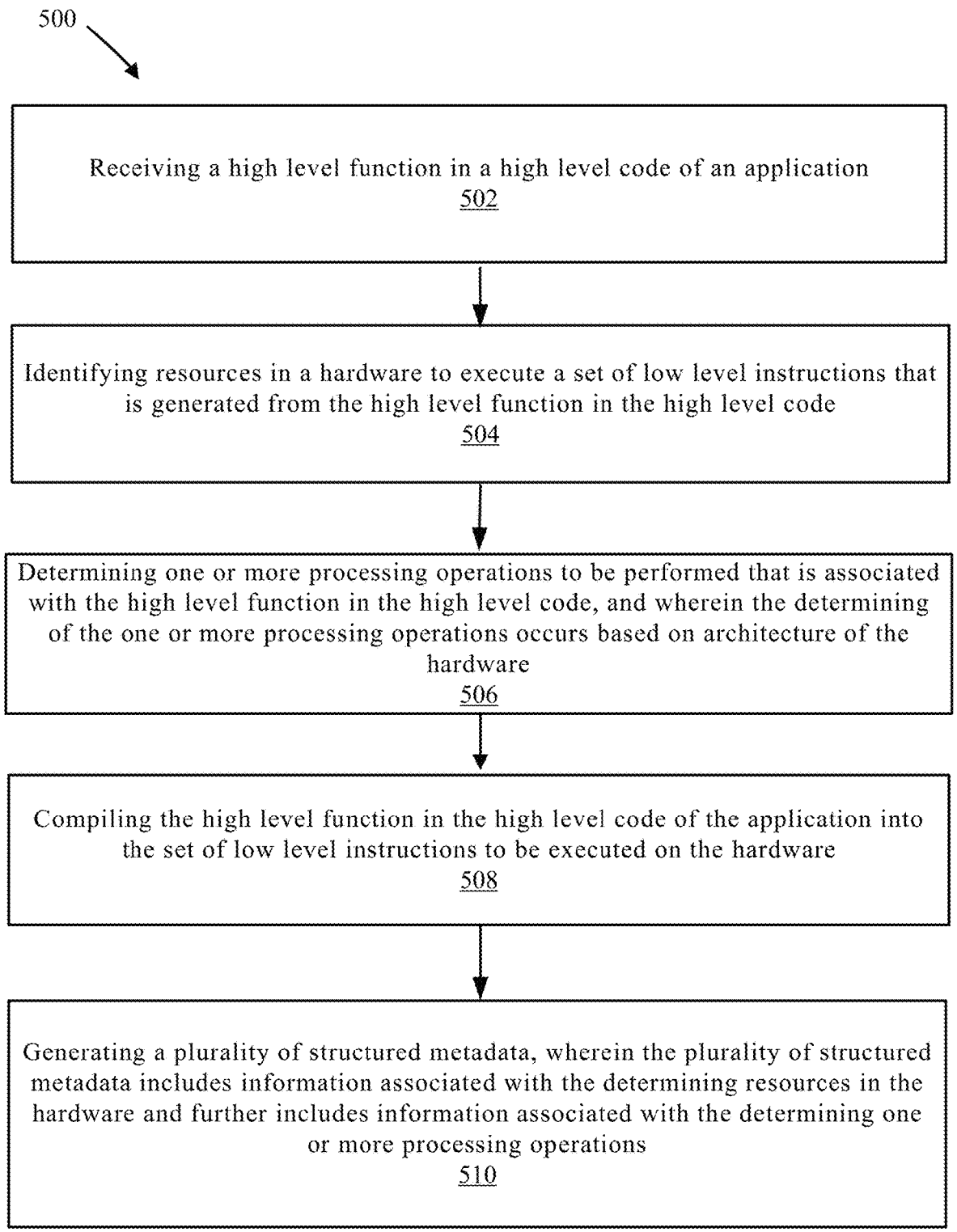
FIG. 5 depicts a flowchart of an example of a process to support generating a multi-level structured metadata when the high-level code is being compiled into low-level instructions of an application for running on ML hardware according to one aspect of the present embodiments.

FIG. 5 depicts a flowchart 500 of an example of a process to support generating a multi-level structured metadata when the high-level code is being compiled into low-level instructions of an application for running on ML hardware according to one aspect of the present embodiments. Although the figure depicts functional steps in a particular order for purposes of illustration, the processes are not limited to any particular order or arrangement of steps. One skilled in the relevant art will appreciate that the various steps portrayed in this figure could be omitted, rearranged, combined and/or adapted in various ways.

In the example of FIG. 5, the flowchart 500 starts at block 502, where a high-level function in a high-level code of an application is received. At step 504, resources in a hardware to execute a set of low-level instructions that is generated from the high-level function in the high-level code is identified. At step 506, one or more processing operations to be performed that is associated with the high-level function in the high-level code is determined. The determining of the one or more processing operations occurs based on architecture of the hardware. At step 508, the high-level function in the high-level code of the application is compiled into the set of low-level instructions to be executed on the hardware. At step 510, a plurality of structured metadata is generated. The plurality of structured metadata includes information associated with the determining resources in the hardware and further includes information associated with the determining one or more processing operations.

It is appreciated that in some embodiments a structured metadata may be selected and fed back into one of the backend compilers in order to optimize its operation. It is further appreciated that in some embodiments the one or more processing operations is one of changing precision, quantization, dimension reordering, or splitting or copying data across one or more processing tiles of the hardware. In one nonlimiting example, the method may further include reducing data movement by using the one or more processing operations. According to some embodiments, the hardware may be a dedicated hardware block including one or more microprocessors and/or OCM units storing the data and/or the set of low-level instructions compiled from the high-level function. According to some embodiments, the method further includes reducing storage by using the one or more processing operations. In one alternative example, the method may further include reducing computations by using the one or more processing operations or reducing data conversion by using the one or more processing operations. It is appreciated that as described above, the method may further include comparing data stored in a memory location as identified by a structured metadata of the plurality of structured metadata to expected data for verification of the high-level function. In some nonlimiting examples, the method may further include comparing data stored in a memory location as identified by a structured metadata of the plurality of structured metadata to expected data and debugging of the high-level function based on the comparison. According to some embodiments, the method may further include determining resources in the hardware and mapping operations and data to one or more tiles of the hardware to execute the set of low-level instructions. It is appreciated that the method may further include optimizing the high-level function of the high-level code based on the plurality of structured metadata.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and the various modifications that are suited to the particular use contemplated.

What is claimed is:

1. A system, comprising:
a computing device including a processor;
a compiler running on the computing device, wherein the compiler includes a plurality of compiler blocks, wherein compiler blocks of the plurality of compiler blocks are compossible, and wherein the compiler is configured to
identify one or more resources in a hardware to execute a set of low-level instructions that is generated from a high-level function in a high-level code associated with an application;
determine one or more processing operations to be performed that is associated with the high-level function in the high-level code, and wherein the determining of the one or more processing operations occurs based on architecture of the hardware; and
compile the high-level function in the high-level code of the application into the set of low-level instructions to be executed on the hardware,
wherein the compiler comprises a frontend compiler and a backend compiler, and wherein the backend compiler comprises the plurality of compiler blocks, and wherein the plurality of compiler blocks is configured to generate a plurality of structured metadata that includes information associated with the the one or more resources in the hardware and the one or more processing operations, and wherein a structured metadata from the plurality of structured metadata is selected and fed back into one compiler block of the plurality of compiler blocks of the backend compiler, and wherein the selected structured metadata is used by the one compiler block of the plurality of compiler blocks of the backend compiler.

2. The system of claim 1, wherein the plurality of structured metadata provides information associated with memory location storing data, and wherein the memory location storing the data is compared to expected data for verification of the high-level function.

3. The system of claim 1, wherein the plurality of structured metadata provides information associated with memory location storing data, and wherein the memory location storing the data is compared to expected data for debugging of the high-level function.

4. The system of claim 1, wherein a compiler block of the plurality of compiler blocks is replaceable with a different compiler block.

5. The system of claim 1, wherein a compiler block of the plurality of compiler blocks is replaceable with a compiler block that includes experimental algorithms for a different mapping strategy or memory allocation.

6. The system of claim 1, wherein a compiler block of the plurality of compiler blocks is replaceable with a compiler block that includes a debug version of the compiler block being replaces.

7. The system of claim 6, wherein the debug version compiler block is configured to store data associated with compilation and modify internal representation and metadata that results in debug binary.

8. The system of claim 1, wherein the one or more processing operations is one of changing precision, quantization, dimension reordering, or splitting or copying data across one or more processing tiles of the hardware.

9. The system of claim 1, wherein the one or more processing operations reduces data movement.

10. The system of claim 1, wherein the one or more processing operations reduces storage.

11. The system of claim 1, wherein the one or more processing operations reduces computations.

12. The system of claim 1, wherein the one or more processing operations reduces data conversion.

13. The system of claim 1, wherein determining resources in the hardware includes mapping of operations and data to one or more tiles of the hardware to execute the set of low-level instructions.

14. The system of claim 1, wherein the hardware is a machine learning (ML) hardware, and wherein the application is an ML operation.

15. The system of claim 1, wherein the hardware is a dedicated hardware block including one or more microprocessors and/or on-chip memory (OCM) units storing the data and/or the set of low-level instructions compiled from the high-level function.

16. The system of claim 1, wherein the compiler is further configured to:
receive a high-level function in a high-level code of an application;
divide the high-level function into core parts; and
check for lexical, grammar, and syntax.

17. A system, comprising:
a compiler comprising a frontend compiler and a backend compiler;
a first output module coupled to the frontend compiler, wherein the first output module is configured to output data renderable to provide information associated with incorrect command line, guidance on correct usage, identification of unsupported operators, or ill-formed networks; and
a second output module coupled to the backend compiler, wherein the second output module is configured to output data renderable to provide information associated with incorrect command line, guidance on correct usage, identification of unsupported operators, or ill-formed networks,
wherein the compiler is configured to:
identify one or more resources in a hardware to execute a set of low-level instructions that is generated from a high-level function in a high-level code;
determine one or more processing operations to be performed that is associated with the high-level function in the high-level code, and wherein the determining of the one or more processing operations occurs based on architecture of the hardware; and
compile the high-level function in the high-level code of an application into the set of low-level instructions to be executed on the hardware.

18. The system of claim 17, wherein the backend compiler comprises:
a plurality of compiler blocks, wherein compiler blocks of the plurality of compiler blocks are compossible.

19. The system of claim 18, wherein the plurality of compiler blocks is configured to generate a plurality of structured metadata that includes information associated with the determining resources in the hardware and one or more processing operations, and wherein a structured metadata from the plurality of structured metadata is selected and fed back into one backend compiler of the plurality of backend compilers, and wherein the selected structured metadata is used by the one backend compiler to optimize its operation.

20. The system of claim 19, wherein the plurality of structured metadata provides information associated with memory location storing data, and wherein the memory location storing the data is compared to expected data for verification of the high-level function.

21. The system of claim 19, wherein the plurality of structured metadata provides information associated with memory location storing data, and wherein the memory location storing the data is compared to expected data for debugging of the high-level function.

22. The system of claim 18, wherein a compiler block of the plurality of compiler blocks is replaceable with a different compiler block.

23. The system of claim 18, wherein a compiler block of the plurality of compiler blocks is replaceable with a compiler block that includes experimental algorithms for a different mapping strategy or memory allocation.

24. The system of claim 18, wherein a compiler block of the plurality of compiler blocks is replaceable with a compiler block that includes a debug version of the compiler block being replaces.

25. The system of claim 24, wherein the debug version compiler block is configured to store data associated with compilation and modify internal representation and metadata that results in debug binary.

26. The system of claim 17, wherein the one or more processing operations is one of changing precision, quantization, dimension reordering, or splitting or copying data across one or more processing tiles of the hardware.

27. The system of claim 17, wherein the one or more processing operations reduces data movement.

28. The system of claim 17, wherein the one or more processing operations reduces storage.

29. The system of claim 17, wherein the one or more processing operations reduces computations.

30. The system of claim 17, wherein the one or more processing operations reduces data conversion.

31. The system of claim 17, wherein determining resources in the hardware includes mapping of operations and data to one or more tiles of the hardware to execute the set of low-level instructions.

32. The system of claim 17, wherein the hardware is a machine learning (ML) hardware, and wherein the application is an ML operation.

33. The system of claim 17, wherein the hardware is a dedicated hardware block including one or more microprocessors and/or on-chip memory (OCM) units storing the data and/or the set of low-level instructions compiled from the high-level function.

34. The system of claim 17, wherein the compiler is further configured to:
receive a high-level function in a high-level code of an application;
divide the high-level function into core parts; and
check for lexical, grammar, and syntax.

35. A method, comprising:
identifying one or more resources in a hardware to execute a set of low-level instructions that is generated from a high-level function in a high-level code;
determining one or more processing operations to be performed that is associated with the high-level function in the high-level code, and wherein the determining of the one or more processing operations occurs based on architecture of the hardware;
compiling the high-level function in the high-level code of an application into the set of low-level instructions to be executed on the hardware,
wherein a plurality of blocks of a compiler performing the identifying, the determining, and the compiling, are compossible, and wherein a block of the plurality of blocks of the compiler is replaceable with another compiler block that includes experimental algorithms for a different mapping strategy or memory allocation or a debug version of the compiler block being replaced.

36. A method, comprising:
identifying one or more resources in a hardware to execute a set of low-level instructions that is generated from a high-level function in a high-level code;
determining one or more processing operations to be performed that is associated with the high-level function in the high-level code, and wherein the determining of the one or more processing operations occurs based on architecture of the hardware;
compiling the high-level function in the high-level code of an application into the set of low-level instructions to be executed on the hardware; and
outputting data renderable to a user to provide information associated with incorrect command line, guidance on correct usage, identification of unsupported operators, or ill-formed networks.

37. A system, comprising:
a means for identifying one or more resources in a hardware to execute a set of low-level instructions that is generated from a high-level function in a high-level code;
a means for determining one or more processing operations to be performed that is associated with the high-level function in the high-level code, and wherein the determining of the one or more processing operations occurs based on architecture of the hardware;
a means for compiling the high-level function in the high-level code of an application into the set of low-level instructions to be executed on the hardware,
wherein the means for identifying, the means for determining, and the means for compiling are compossible, and wherein a compiler block of a plurality of blocks of the compiler is replaceable with another compiler block that includes experimental algorithms for a different mapping strategy or memory allocation or a debug version of the compiler block being replaced.

38. A system, comprising:
a first means comprising a frontend compiler and a backend compiler, wherein the means is configured to:
identify one or more resources in a hardware to execute a set of low-level instructions that is generated from a high-level function in a high-level code;
determine one or more processing operations to be performed that is associated with the high-level function in the high-level code, and wherein the determining of the one or more processing operations occurs based on architecture of the hardware; and
compile the high-level function in the high-level code of an application into the set of low-level instructions to be executed on the hardware;
a second means coupled to the frontend compiler for outputting data renderable to provide information associated with incorrect command line, guidance on correct usage, identification of unsupported operators, or ill-formed networks; and
a third means coupled to the backend compiler for outputting data renderable to provide information associated with incorrect command line, guidance on correct usage, identification of unsupported operators, or ill-formed networks.

39. A system, comprising:
a computing device comprising a processor;
a compiler running on the computing device, wherein the compiler includes a plurality of compiler blocks, wherein compiler blocks of the plurality of compiler blocks are compossible, wherein a compiler block of the plurality of compiler blocks is replaceable with another compiler block that includes experimental algorithms for a different mapping strategy or memory allocation, and wherein the compiler is configured to
identify one or more resources in a hardware to execute a set of low-level instructions that is generated from a high-level function in a high-level code associated with an application;
determine one or more processing operations to be performed that is associated with the high-level function in the high-level code, and wherein the determining of the one or more processing operations occurs based on architecture of the hardware; and
compile the high-level function in the high-level code of the application into the set of low-level instructions to be executed on the hardware.

40. A system, comprising:
a computing device comprising a processor;
a compiler running on the computing device, wherein the compiler includes a plurality of compiler blocks, wherein compiler blocks of the plurality of compiler blocks are compossible, wherein a compiler block of the plurality of compiler blocks is replaceable with another compiler block that includes a debug version of the compiler block being replaced, and wherein the compiler is configured to
identify one or more resources in a hardware to execute a set of low-level instructions that is generated from a high-level function in a high-level code associated with an application;
determine one or more processing operations to be performed that is associated with the high-level function in the high-level code, and wherein the determining of the one or more processing operations occurs based on architecture of the hardware; and compile the high-level function in the high-level code of the application into the set of low-level instructions to be executed on the hardware.

* * * * *